Nov. 20, 1945.     W. G. WESSMAN     2,389,224
GRINDING MACHINE
Filed Aug. 10, 1943     15 Sheets-Sheet 3

INVENTOR
Walter G. Wessman
BY John J Hanrahan
ATTORNEY

Nov. 20, 1945.   W. G. WESSMAN   2,389,224
GRINDING MACHINE
Filed Aug. 10, 1943   15 Sheets-Sheet 4

INVENTOR
Walter G. Wessman
BY
ATTORNEY

Nov. 20, 1945.  W. G. WESSMAN  2,389,224
GRINDING MACHINE
Filed Aug. 10, 1943   15 Sheets-Sheet 6
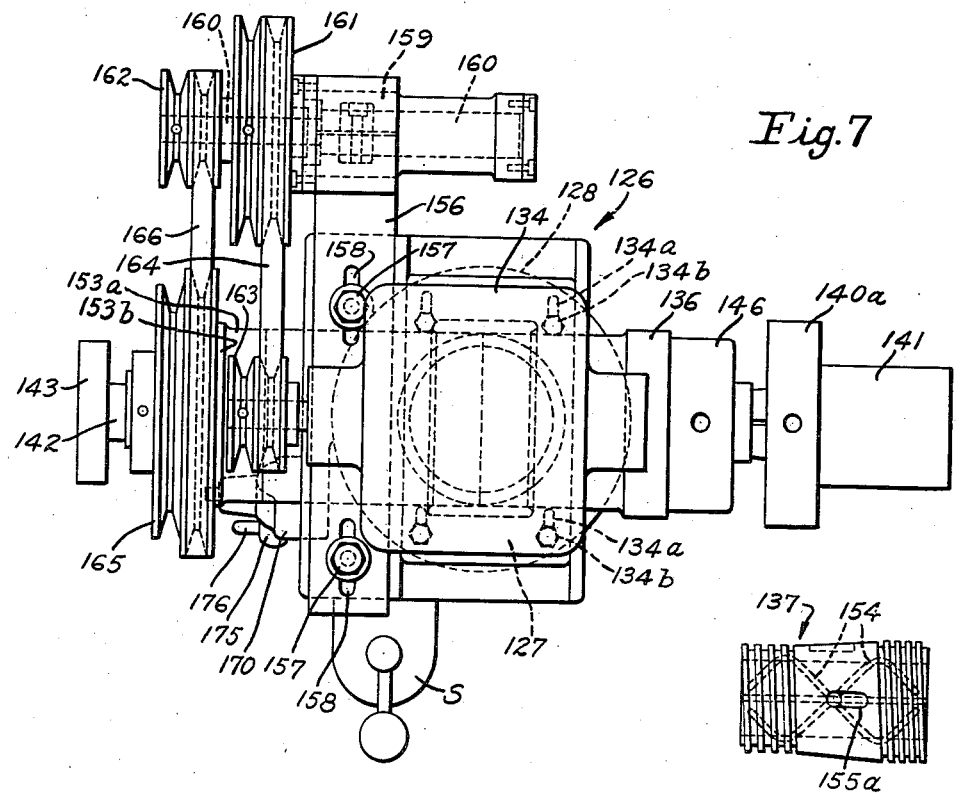
Fig. 7
Fig. 12
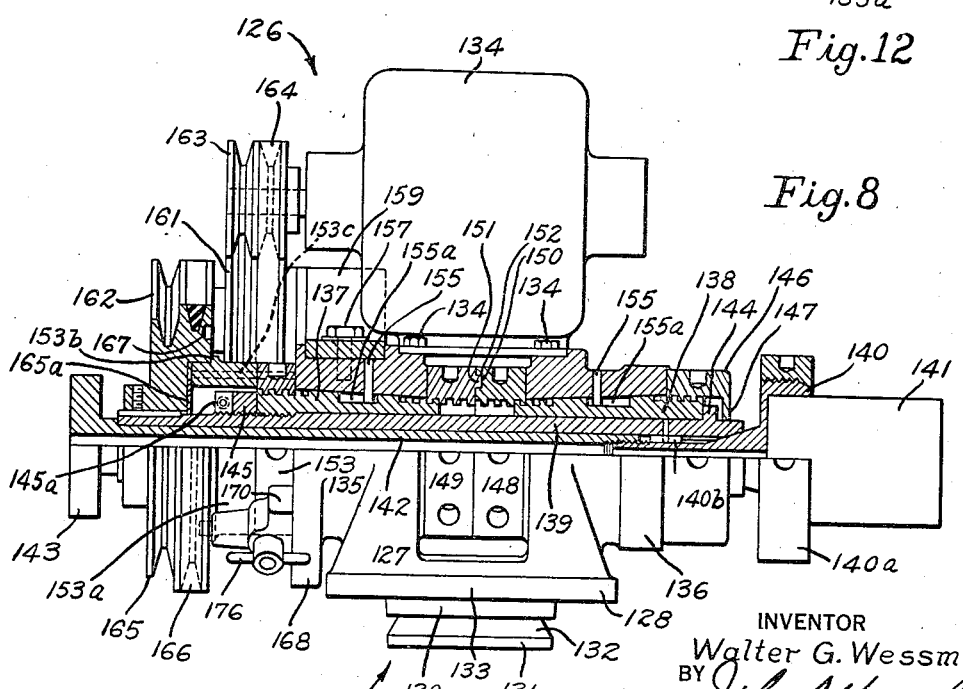
Fig. 8
INVENTOR
Walter G. Wessman
BY
John A Hanrahan
ATTORNEY Nov. 20, 1945.     W. G. WESSMAN     2,389,224
GRINDING MACHINE
Filed Aug. 10, 1943     15 Sheets-Sheet 7

INVENTOR
Walter G. Wessman
BY
ATTORNEY

Nov. 20, 1945.   W. G. WESSMAN   2,389,224
GRINDING MACHINE
Filed Aug. 10, 1943   15 Sheets-Sheet 8

INVENTOR
Walter G. Wessman
BY
ATTORNEY

Nov. 20, 1945.    W. G. WESSMAN    2,389,224
GRINDING MACHINE
Filed Aug. 10, 1943    15 Sheets-Sheet 9

INVENTOR
Walter G. Wessman
BY John H. Hanrahan
ATTORNEY

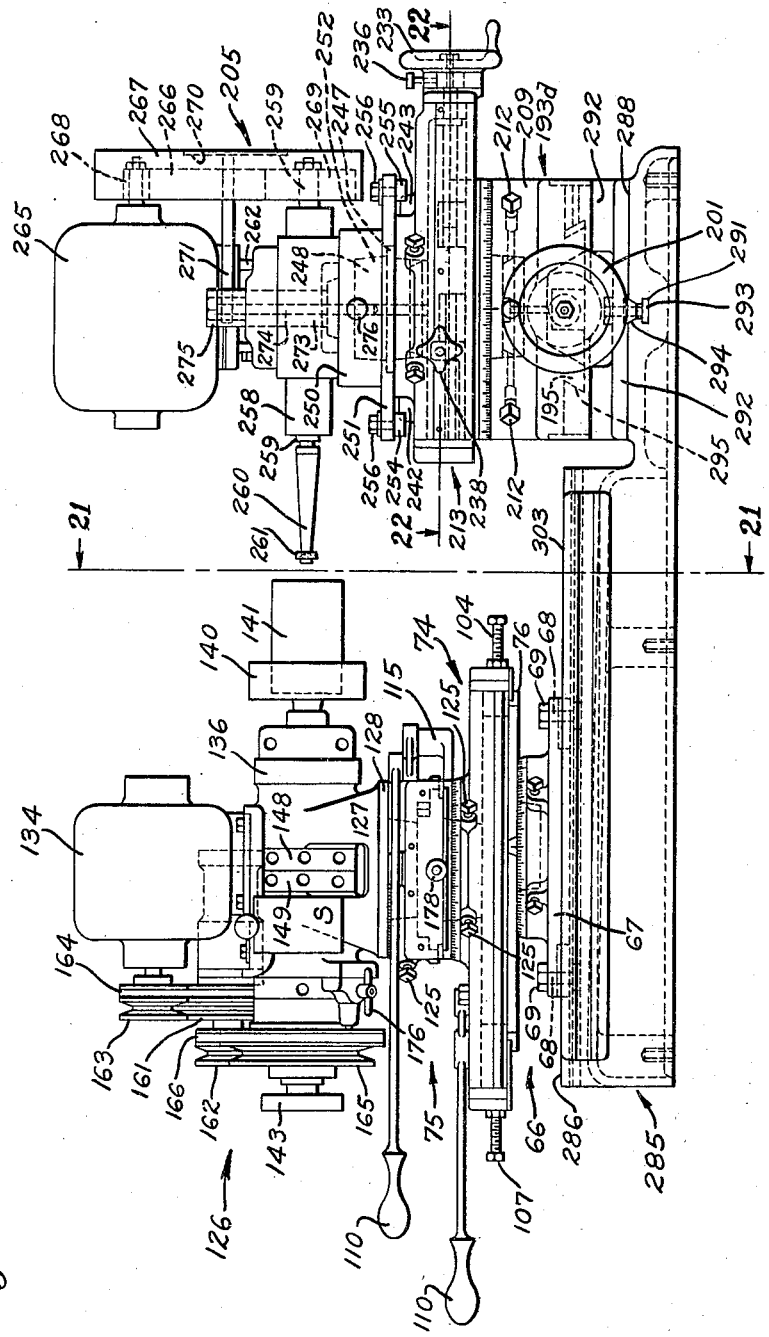

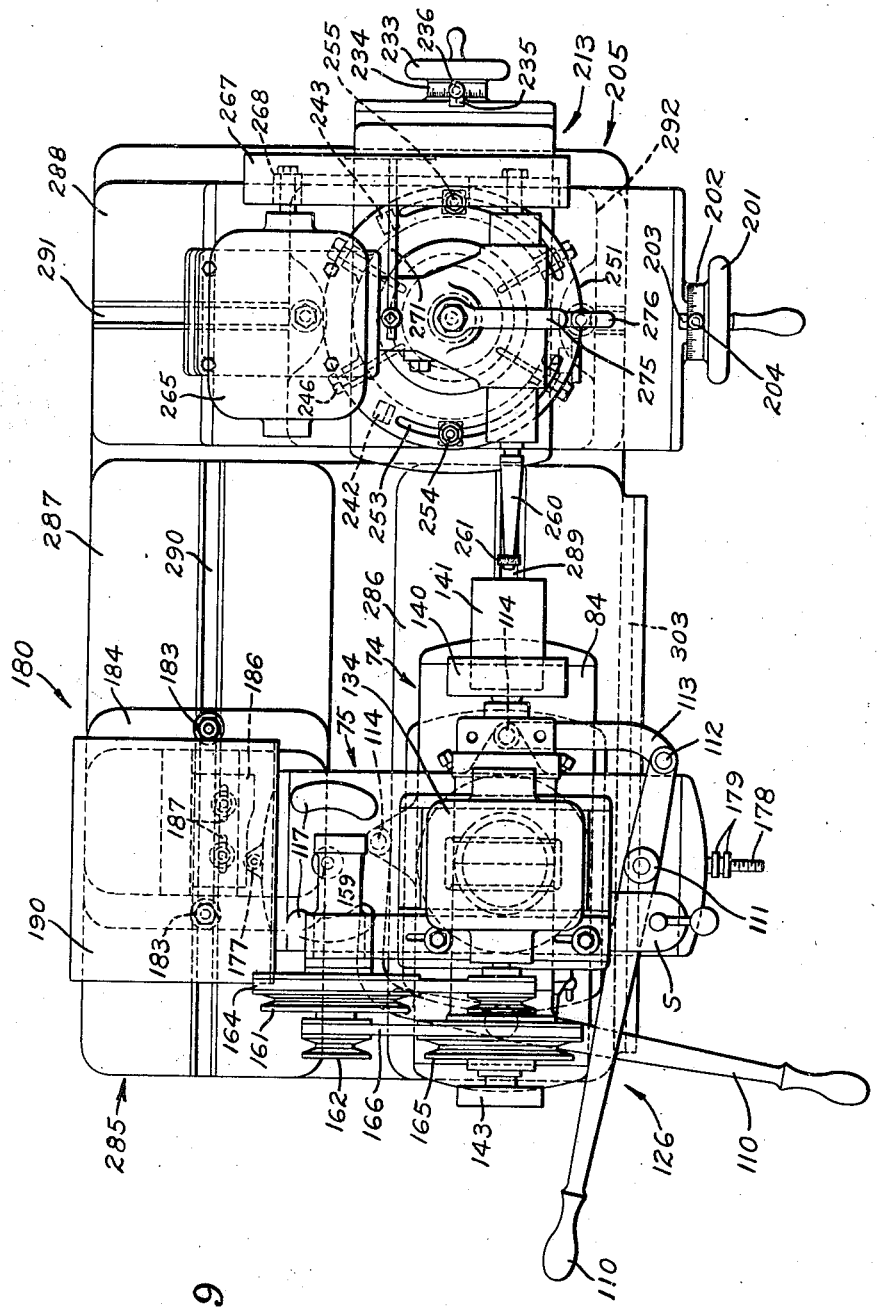

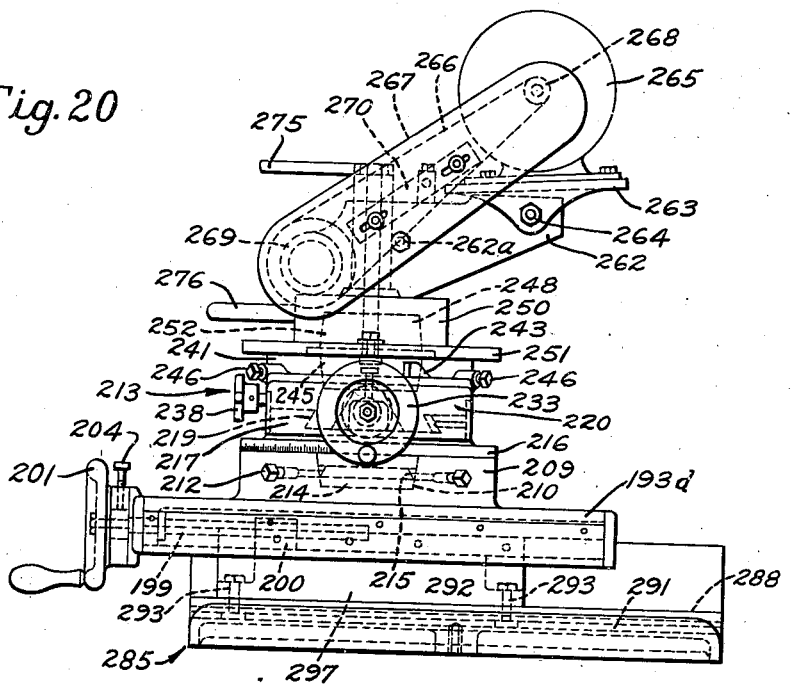
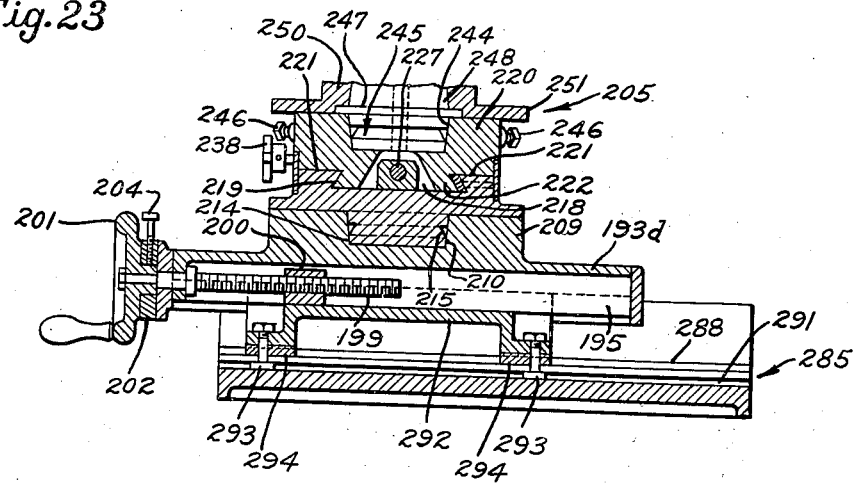

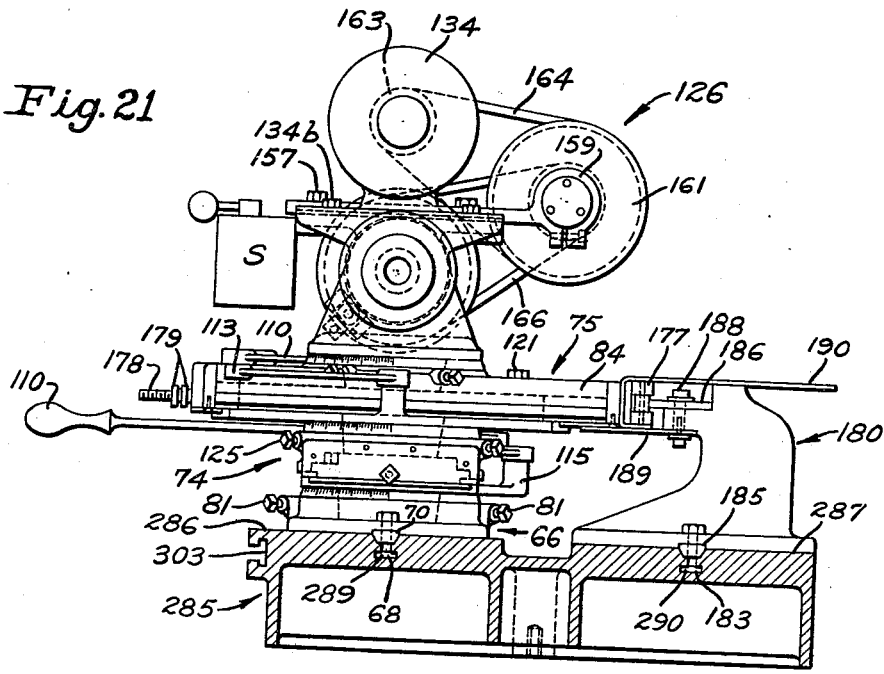

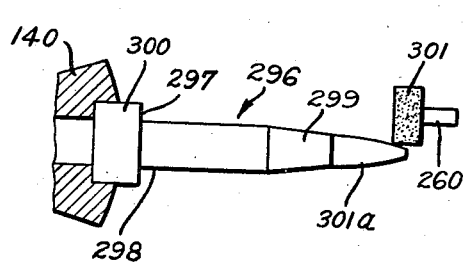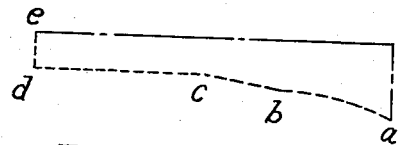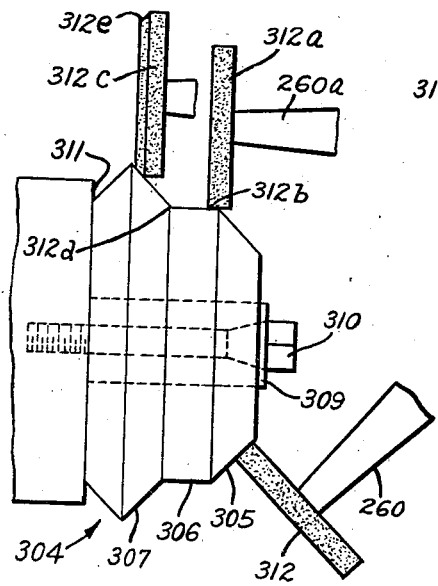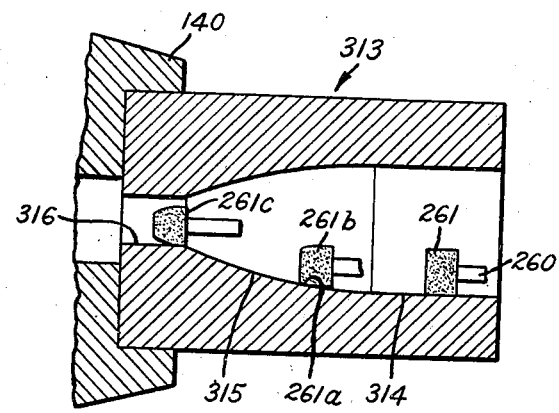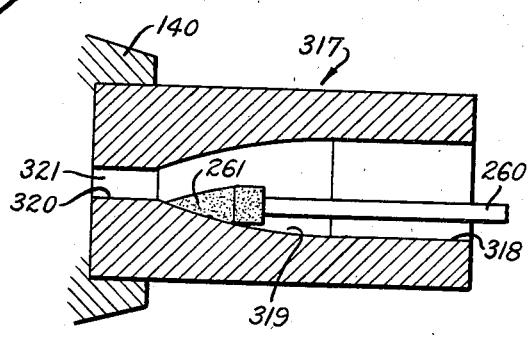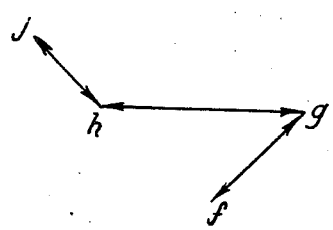

Nov. 20, 1945.   W. G. WESSMAN   2,389,224
GRINDING MACHINE
Filed Aug. 10, 1943   15 Sheets-Sheet 15

INVENTOR
Walter G. Wessman
BY
ATTORNEY

Patented Nov. 20, 1945

2,389,224

UNITED STATES PATENT OFFICE 2,389,224

GRINDING MACHINE

Walter G. Wessman, Fairfield, Conn.

Application August 10, 1943, Serial No. 498,058

35 Claims. (Cl. 51—100)

This invention relates to new and useful improvements in abrading apparatus and has particular relation to a grinding machine adapted to be used for grinding, lapping and polishing operations.

An object of the invention is to provide a grinding machine adapted to do multi-angle grinding with one set-up and without disturbing such set-up.

Among the other objects of the invention are the provision of a machine adapted for operation by unskilled help to do precision grinding, to do multi-angle grinding and/or profile grinding, both internal and external, in one set-up without the use of especially shaped grinding wheels.

Other objects and advantages of the invention will become apparent from a consideration of the following detailed description taken in connection with the accompanying drawings wherein satisfactory embodiments of my invention are shown. However, it is to be understood that the invention is not limited to the details disclosed but includes all such variations and modifications as fall within the spirit of the invention and the scope of the appended claims.

In the drawings:

Fig. 7 is a plan view on a larger scale of the work holding head of the machine;

Fig. 8 is a view partly in front elevation and partly in section of the head of Fig. 7;

Fig. 12 is a view of a bearing means alone;

Fig. 18 is a front elevational view of the machine of the invention as incorporated in a bench type of machine;

Fig. 19 is a top plan view of the bench type of machine of Fig. 18;

Fig. 20 is an end elevational view of said machine, the view being taken as looking from the right in Fig. 18;

Fig. 21 is a vertical sectional view through the machine, the view being taken as along the plane of the line 21—21 of Fig. 18;

Fig. 22 is a horizontal sectional view, the same being taken as along the plane of the line 22—22 of Fig. 18;

Fig. 23 is a transverse sectional view on the line 23—23 of Fig. 22;

Fig. 24 is a diagrammatic view showing a grinding operation being performed with my present machine;

Fig. 25 is similar view showing the motions of parts as involved in the grinding of the work shown in Fig. 24;

Fig. 26 is a view similar to Fig. 24 but illustrating the use of the invention in connection with a different piece of work;

Fig. 27 is the diagram of the motions of the machines parts in the grinding of the piece of work of Fig. 26;

Fig. 28 is a sectional view illustrating an internal grinding job;

Fig. 29 is a sectional view illustrating another internal grinding job;

Figure 1:
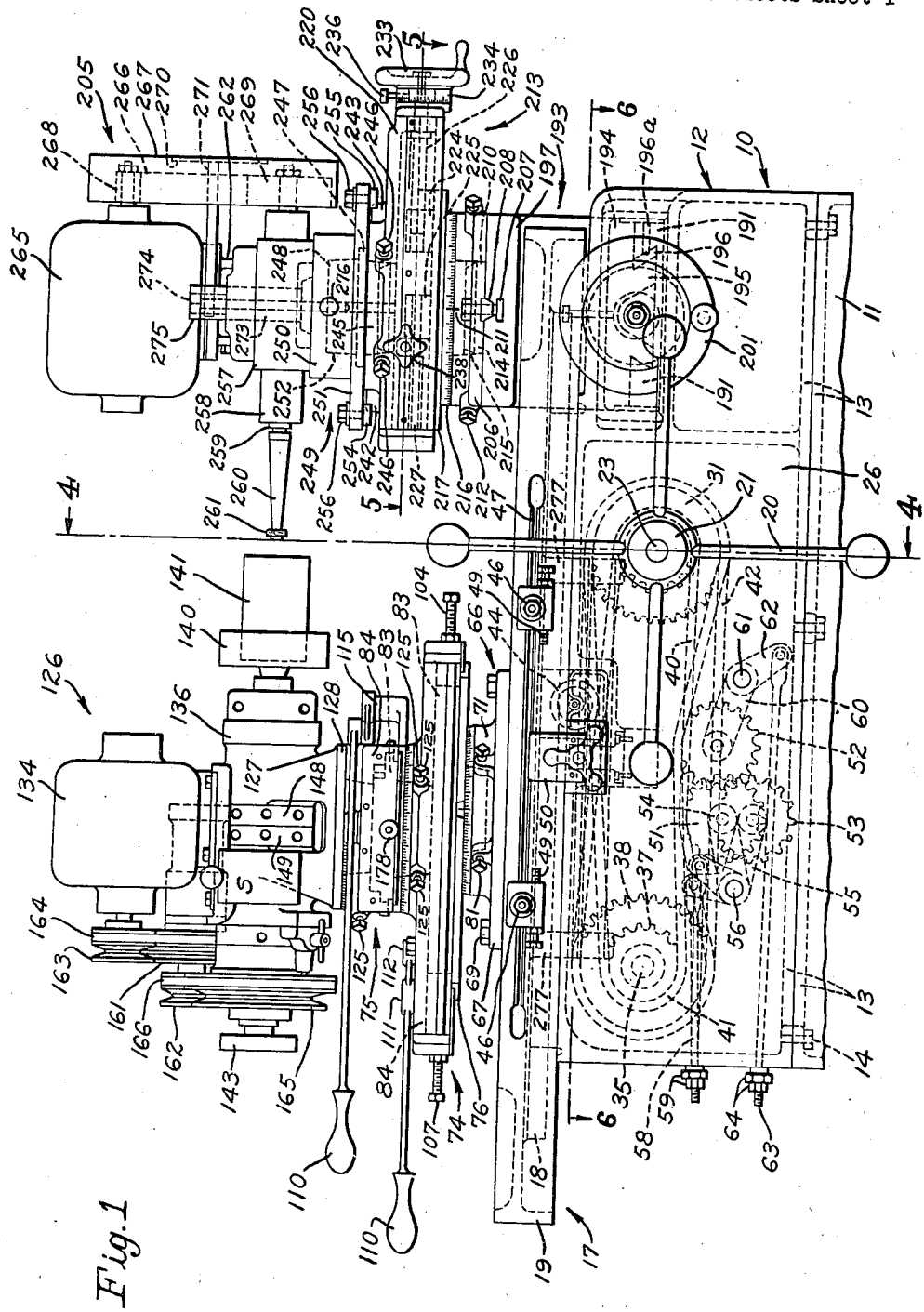
Fig. 1 is a front elevational view of the upper portion of a pedestal type of machine made in accordance with the present invention.
Figure 2:
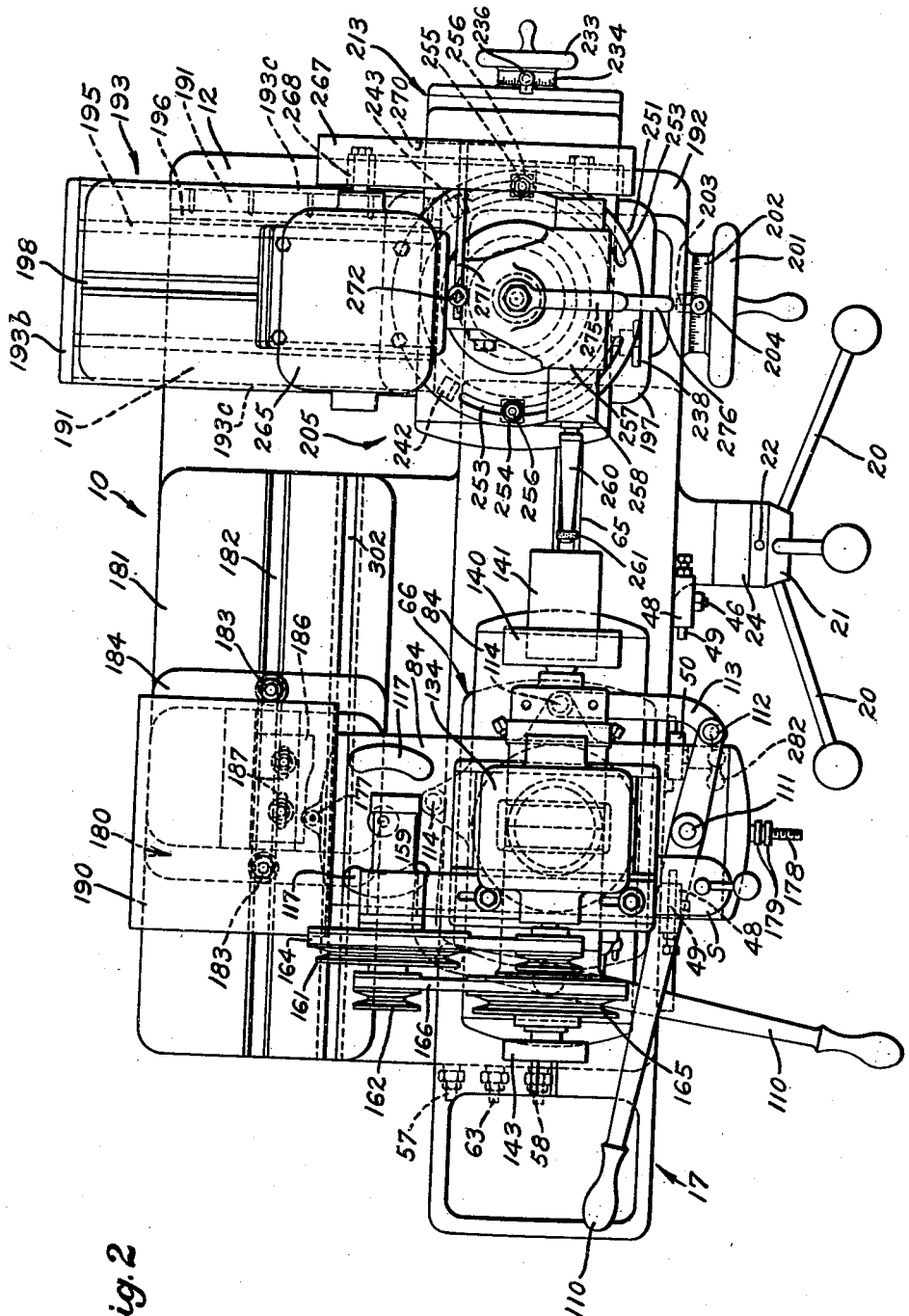
Fig. 2 is a top plan view of said machine.
Figure 3:
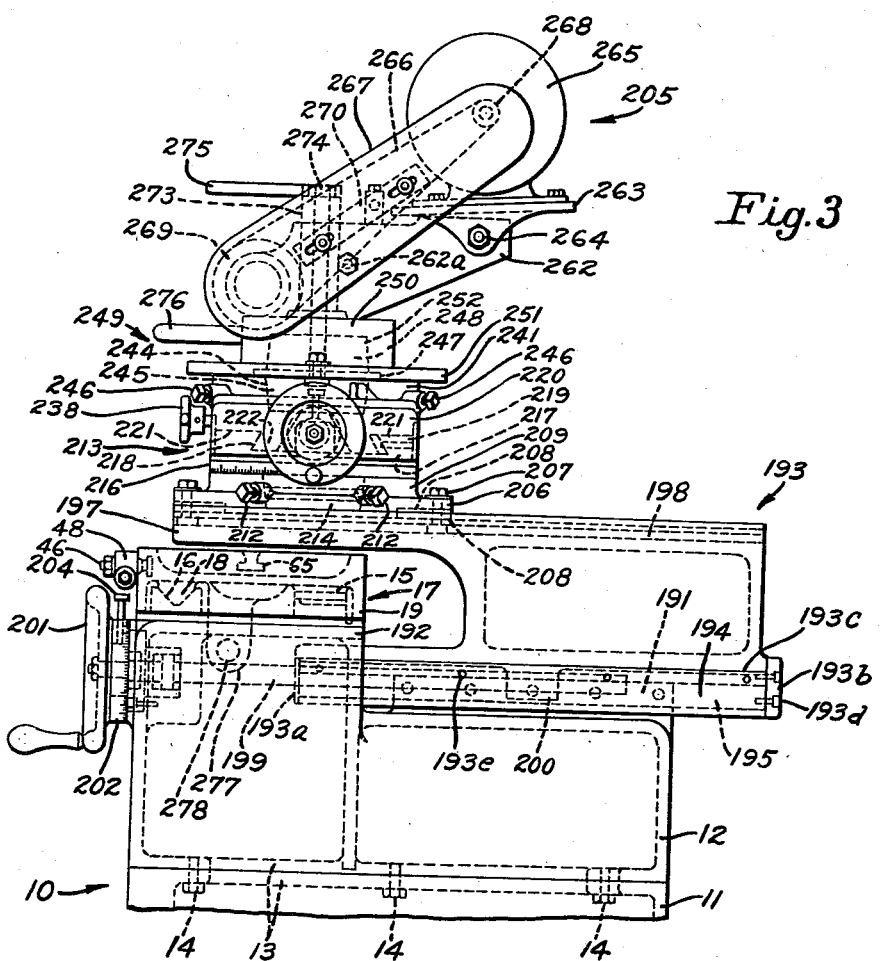
Fig. 3 is an end elevational view thereof the view being taken as looking from the right in Fig. 1.
Figure 17:
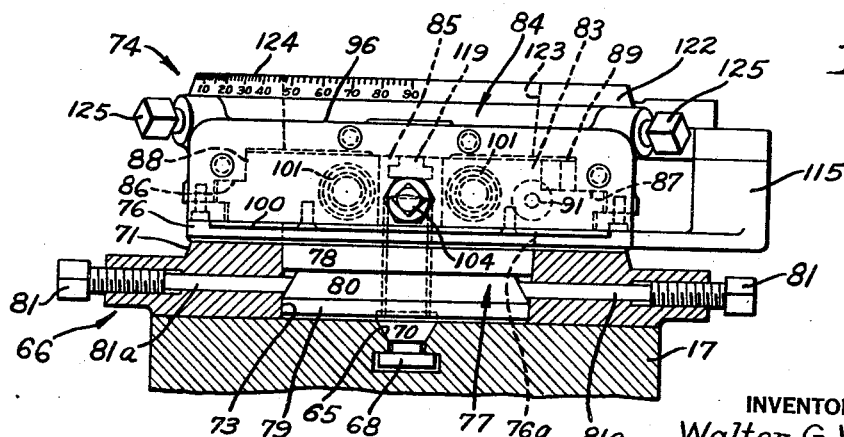
Fig. 17 is a transverse sectional view taken as along the line 17—17 of Fig. 13.
Figure 4:
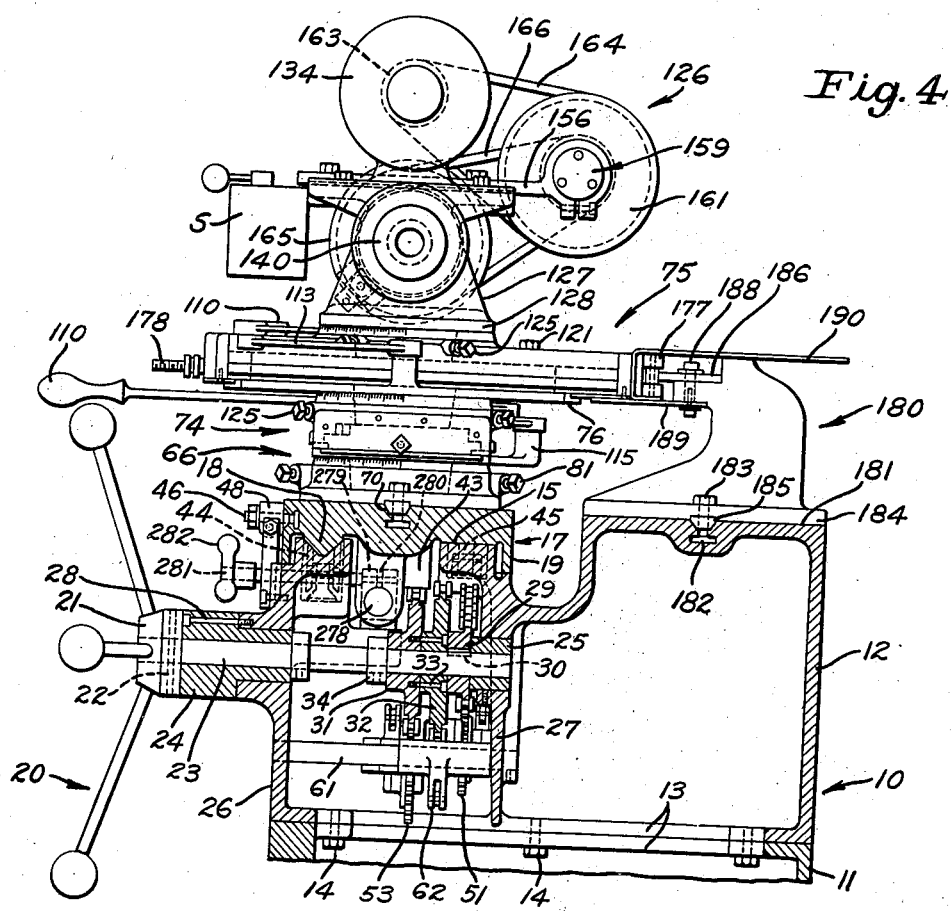
Fig. 4 is a transverse sectional view taken as along the plane of the line 4—4 of Fig. 1.
Figure 5:
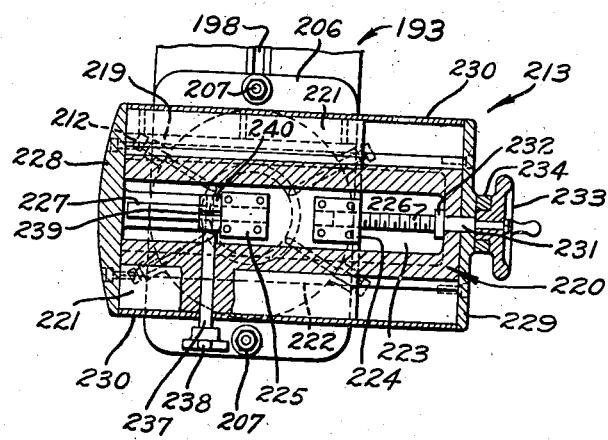
Fig. 5 is a horizontal sectional view taken as along the plane of the line 5—5 of Fig. 1.
Figure 6:
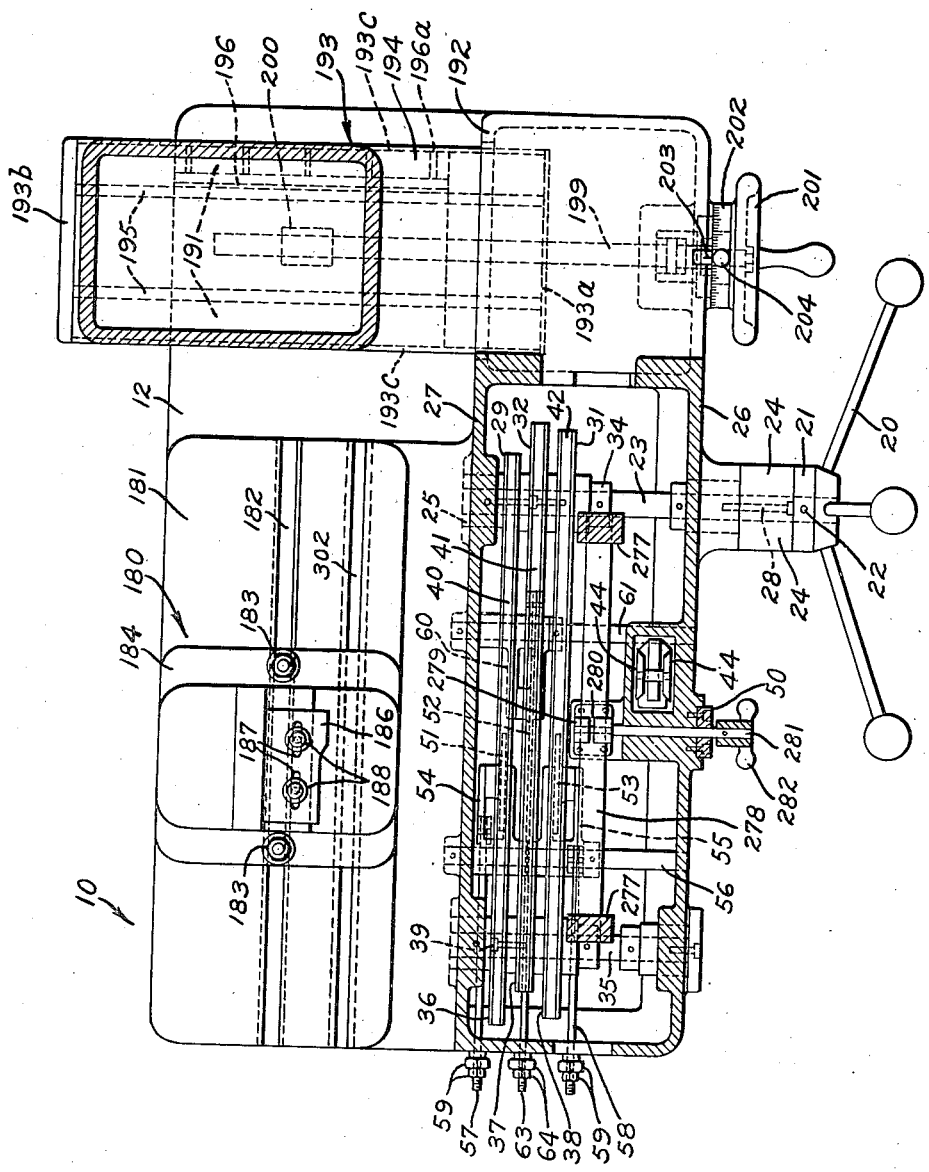
Fig. 6 is a horizontal sectional view taken as along the plane of the line 6—6 of Fig. 1.
Figure 9:
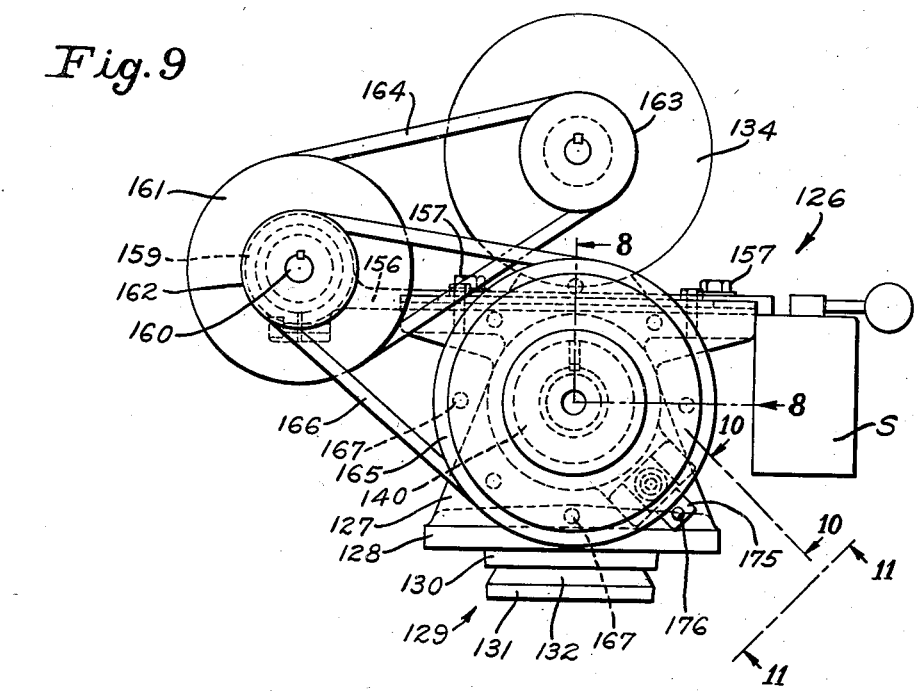
Fig. 9 is an end elevational view of such head the view being taken as looking from the left in Fig. 7.
Figures 10, 11:
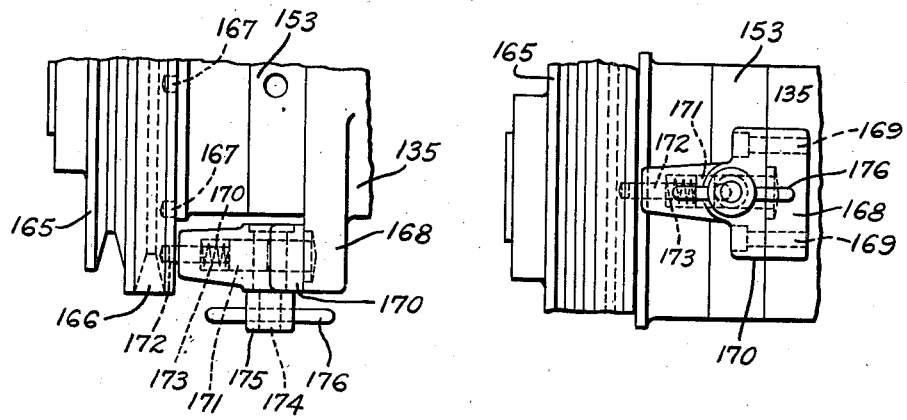
Fig. 10 is a detail view as looking from the line 10—10 of Fig. 9 and showing in elevation a locking means employed.
Fig. 11 is a similar view of the same means but the view is taken as looking from the line 11—11 of Fig. 9.

Referring in detail to the drawings and at first more particularly to the form of the invention as shown in Figs. 1 through 17, my improved machine as shown includes a base or pedestal generally designated 10 and including a lower portion 11 and an upper portion or machine bed 12. Portions 11 and 12 have engaging flange portions 13 through which are passed bolts 14 whereby the pedestal portions are secured to one another.

In the forward portion of its upper side the bed 12 is provided with a flat way 15 and a V-way 16 (see particularly Fig. 4) and mounted on such portion of the bed and movable along said ways is a table generally designated 17 and provided with portions, as shown, including the V-shaped block 18 entering the V-way 16 for guiding movement of such table. A depending skirt 19 about the edge of the table 17 serves to prevent the entrance of emery or other dust into the mentioned ways.

Means are provided for manually moving the table in the direction of its length. Such means (see Figs. 4 and 6) includes a lever means 20 having a hub 21 pinned at 22 or otherwise made fast to a shaft 23 journaled in bearings 24 and 25 in a forward wall 26 and a web 27 of the bed 12. Bearing 24 is made fast to said wall 26 as by being secured in place by bolts or other means 28. A sprocket 29 is fast to shaft 23 being keyed thereto at 30 or otherwise made to turn therewith. Additional sprockets 31 and 32 are turnable about said shaft as a mount and center and such sprockets are secured to one another by bolts 33. All of the three named sprockets are located on shaft 23 between the bearing 25 and a collar 34 fixed to the shaft in any suitable manner.

Journaled in the bed 12 in spaced but parallel relation to shaft 23 is a second shaft 35 having sprockets 36, 37 and 38 turnable thereon and of which the sprockets 36 and 37 are secured together for unitary turning movement as by bolts or the like 39. In the described construction the sprocket 36 is of larger diameter than but is aligned with sprocket 29, while sprocket 37 is of smaller diameter than but is aligned with sprocket 32, and sprockets 31 and 38 are of the same diameter and are in alignment.

Sprocket chains 40, 41 and 42 are trained over the pairs of aligned sprockets 36 and 29, 37 and 32 and 38 and 31, respectively. On turning of lever means 20 the shaft 23 will be turned and will impart the same movement to sprocket 29 which through chain 40 will cause turning of the sprocket 36. The latter being bolted or otherwise secured to sprocket 37 the sprockets 36 and 37 will turn as a unit and result in chain 41 being driven to in turn drive the sprocket 32. As sprocket 32 is fast with sprocket 31 the latter will be driven and will feed the chain 42 and thus drive the sprocket 38 which is free of sprockets 36 and 37 as well as of the shaft 35.

The described sprocket and sprocket chain structure is for imparting movement to the machine table 17. Such table, on its underside intermediate its ends is provided with a lug or projection 43 to which the upper flight of the chain 42 is secured (see Fig. 4). It will be clear that owing to the variations in the diameters of the sprockets employed the chain 42 may be moved manually at a very low speed and so on manipulation of the lever means 20 minute movements, of great accuracy, may be manually imparted to the table 17. Preferably oil applying rollers 44 and 45 are provided for applying lubricant to the lower surfaces of the table portions engaging with the ways 15 and 16 at the upper side of machine bed 12.

Bolts 46 having their heads disposed in a slot 47 extending longitudinally of the table 17 to serve to secure blocks 48 to such table. Clearly these blocks may be adjusted relatively in the direction of the length of the slot 47 and each of the blocks 48 carries a screw 49 adapted for adjustment through the block. The bolts 49 are aligned with a lug 50 on the machine bed 12 and such lug is in fact located between such bolts. With this arrangement it will be understood that on adjustment of the blocks 48 and of the screws 49 one or the other of such screws will engage the stop lug 50 as the table 17 is moved in one direction or the other.

Thus the mentioned lugs, blocks and screws provided adjustable means for limiting movements of the table by the lever means 20 and the sprocket and chain mechanism previously described. It will be understood that in any set-up the blocks 48 and screws 49 are properly adjusted and set and that thereafter as the table is moved back and forth the lug 50 will be engaged first by one of the stop screws and then the other as the table movement is reversed. The chain and sprocket means may be a pulley and belt arrangement if desired although the chain and sprocket is more positive and also gives a smooth steady movement to the table.

Means are provided for taking up slack in the respective chains 40, 41 and 42. To this end, idler sprockets 51, 52 and 53 are mounted within the bed 12 in engagement with the lower flights of the chains 40, 41 and 42 respectively. Sprockets 51 and 53 are mounted on the corresponding arms of bell-cranks 54 and 55 pivoted on a shaft 56. Connected with the other arms of said bell-crank are rods 57 and 58 passing through one end of bed 12 and provided with nuts 59 adapted to be tightened to rock the bell-cranks on the shaft 56 and thus carry the sprockets 51 and 53 upwardly to tighten the chains 40 and 42.

Sprocket 52 is mounted on an arm 60 turnable about a shaft 61 with an arm 62 to the lower end of which is connected the inner end of a rod 63 passing through the mentioned end wall of the bed 12 and beyond the latter provided with nuts 64. With this arrangement chain 41 may be tightened on tightening of the nuts 64 to draw the rod 63 further through the end wall of bed 12 and thereby rock the arms 60 and 62 about shaft 61 forcing idler 52 upwardly against the lower flight of said chain.

In its upper side table 17 is provided with a V—T slot 65 extending longitudinally thereof and comprising a combination of a V-slot and a T-slot. Such slot in its outer or upper portion is in the form of a V while its inner portion is an inverted T in transverse section. Disposed on the upper side of the table 17 is a base 66 (see Figs. 1, 2, 4, 14 and 15) including a plate-like portion 67 resting on the table. Bolts 68 have their heads disposed in the inverted T-shaped portion of the slot 65 and pass upwardly through the plate-like portion 67 at the upper side of which they are provided with nuts 69.

These bolts pass through key-like members 70 (see particularly Figs. 4, 14 and 15) entering partly into grooves in the underside of portion 67 and having wedge or V-shaped portions entering the corresponding portions of the slot 65. With this arrangement it will be clear that on loosening of the nuts 69 the base 66 may be moved longitudinally of the table 17 along the slot 65. On tightening of said nuts the base 66 will be drawn against the upper side of the table and the keys 70 will be forced tight into the V-shaped portion of slot 65 thus securing and aligning the base 66 with respect to the V-shaped block 18 of table 17 to insure movement and location of the centers parallel to the V-ways 16 in bed 12.

Base 66 includes a central upwardly directed annular portion 71 graduated about its upper edge with the scale 72 marked thereon beginning at zero, as shown and building up from each side of said zero. The base has an annular slightly tapered socket 73 therethrough and such socket being tapered is of slightly greater diameter at the upper side of the base and is concentric with the raised central portion 71 of the base.

Mounted on base 66 (see Fig. 1) is a slide generally designated 74 and mounted on said slide and shown in angular relation thereto is another but similar slide generally designated 75. Since these slides are, with certain exceptions hereinafter fully pointed out, identical in construction a detailed description of but one will be given. With particular reference to Figs. 13, 14, 15 and 17 it will be noted that the slide 74 includes a bottom cover plate 76 and a swivel slide 83 from which depends a slightly tapered projection 77 passing through a snugly fitted tapered hole 76a in said plate 76 and disposed in the socket or opening 73 in base 66.

Projection 77 includes upper and lower portions 78 and 79 (they are of the construction of projection 129 of Figs. 8 and 9) bearing against the side walls of the said socket 73 whereby the slide 74 is adapted to be turned or rotated on the base 66. Intermediate such bearing portions 78 and 79 the projection is undercut or cut away to provide a portion having an inclined or tapered wall 80 of smallest diameter toward the upper end of the projection and tapering into the bearing portion 79.

Securing bolts 81 pass through radially disposed openings in the base 66. These bolts are threaded for portions of their lengths and the mentioned openings are partly threaded whereby the bolts may be threaded inwardly and outwardly, radially, of the base. The inner flat ends of these bolts 81 bear on the outer flat ends of binder pins 81a journaled in a reduced diameter portion 81b and entering the socket 73 at a point to engage the inclined wall 80 of the projection 77. From this it will be clear that on tightening of the bolts their inner end portions will force the binder pins 81a against the wall portion 80 and with a cam-like action will tend to draw the projection 77 into the socket 73.

The result of this action will be that the swivel slide 83 is drawn down tight against coverplate 76 which in turn is drawn tight against the upper side of the base 66. Thus the said slide portion will be held against any casual movement, turning or otherwise, relative to base 66. On slight loosening of the radial bolts 81 the projection 77, and thus the entire slide 74 may be turned relative to base 66. Preferably the cover plate 76 is provided with a mark 82 or the like to be read in connection with the graduations on the upper central portion of base 66. It is noted with the described arrangement of the radial bolts 81 when they are tightened to secure the slide in any adjusted relation to the base they have no tendency to disturb such adjustment. While four of the radially disposed bolts 81 have been shown in the drawings it will be understood that this number may be varied.

The cover plate 76 is a relatively stationary part of the slide 74 and is pinned or otherwise made rigid with swivel slide 83 as by a pin 76b. The relatively movable portion 84 of said slide may be reciprocated on swivel slide 83 as will appear. Part 84 bears downwardly on swivel slide 83 at several spaced points as at 85, 86 and 87. Additionally it has lateral contact at 88 and provision for adjustment for wear between the parts is made by an adjustable tapered gib 89 adapted to be adjusted and held in adjusted positions by screws 90 and 91.

A pair of side strips 92 and 93 are secured by screws 94 to the lower longitudinal edges of the movable slide part 84 and entering under the lower side edge portions of swivel slide 83 serve to assist in guiding movements of the part 84 on said swivel slide and in addition prevent any vertical movement of said part relative to the swivel slide. Part 84 has relatively heavy end pieces 95 and 96 secured to its respective ends by screws 97 and these end pieces are located beyond the ends of the swivel slide 83.

Figure 14:
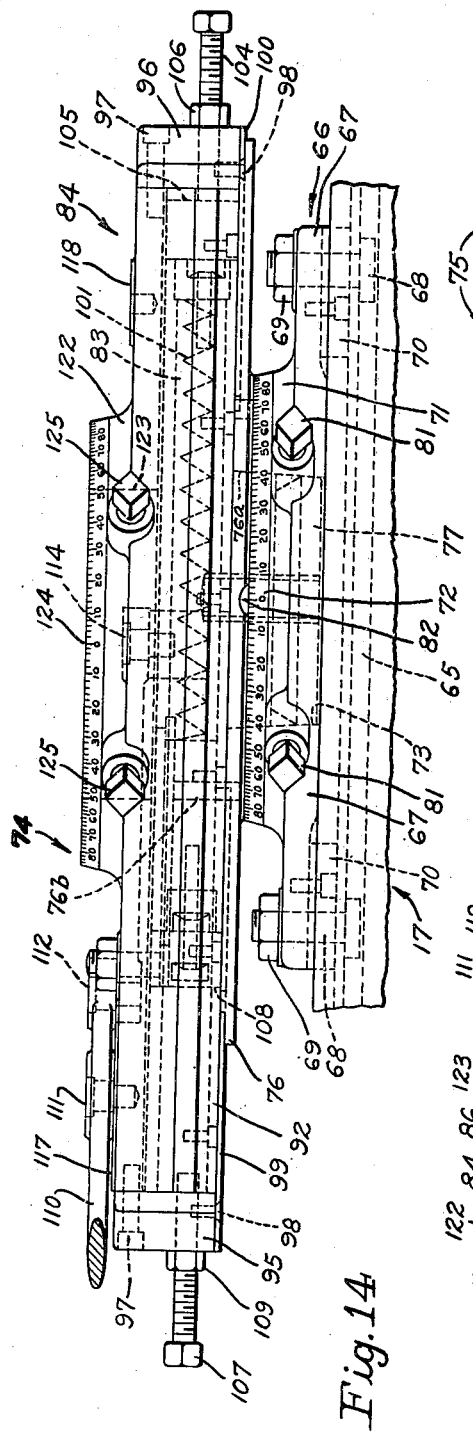
Fig. 14 is a side elevational view of said slide on said enlarged scale and showing some associated parts.

Screws 98 secure closure plates 99 and 100 to the lower edges of the pieces 95 and 96 respectively and such plates extend from said pieces toward one and another and serve to prevent the entrance of dust into the ways or bearing surfaces between part 84 and swivel slide 83. As seen in Fig. 14 plate 99 is closing the space between end piece 95 and the adjacent end of cover plate 76 while plate 100 is entered over the other end portion of said cover plate 76. On movement of slide part 84 toward the right in said figure plate 100 will be exposed and will serve to exclude dust from entering between end 96 and the adjacent portion of bottom plate 76 while plate 99 will move in over the other end portion of the bottom plate.

Figure 13:
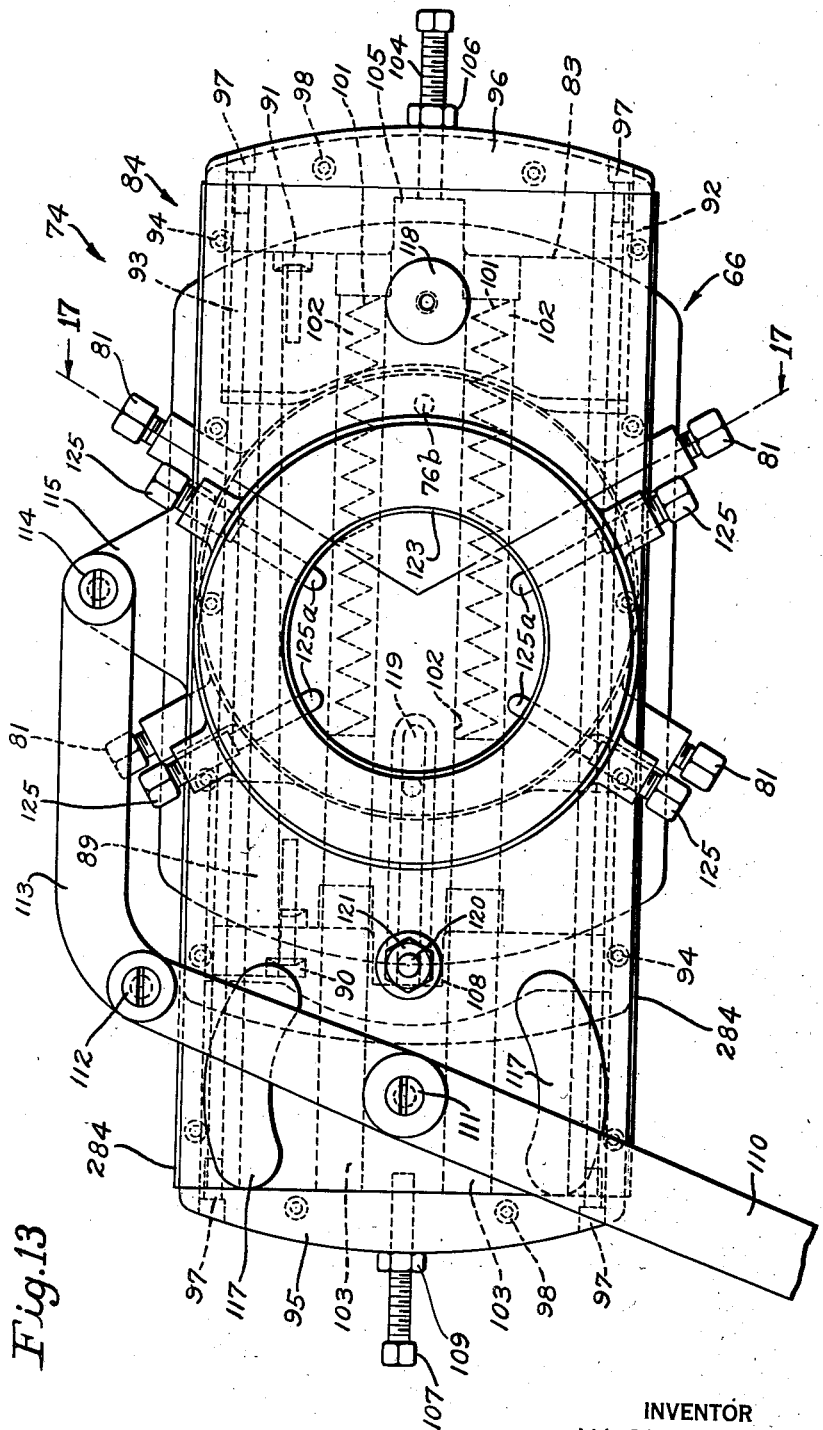
Fig. 13 is a plan view on an enlarged scale of a slide employed.
Figure 16:
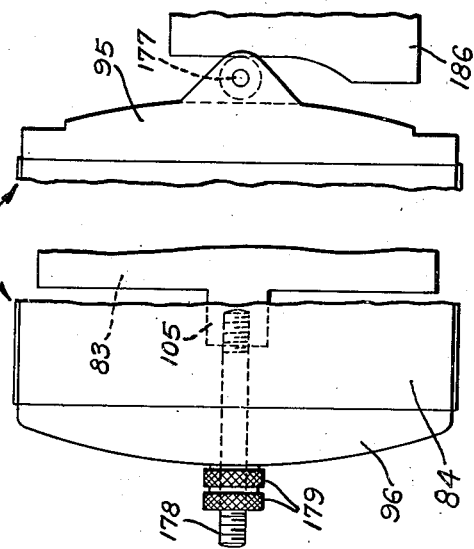
Fig. 16 is a top plan view of said slide with parts broken away and showing the same as adapted for profile grinding.
Figure 15:
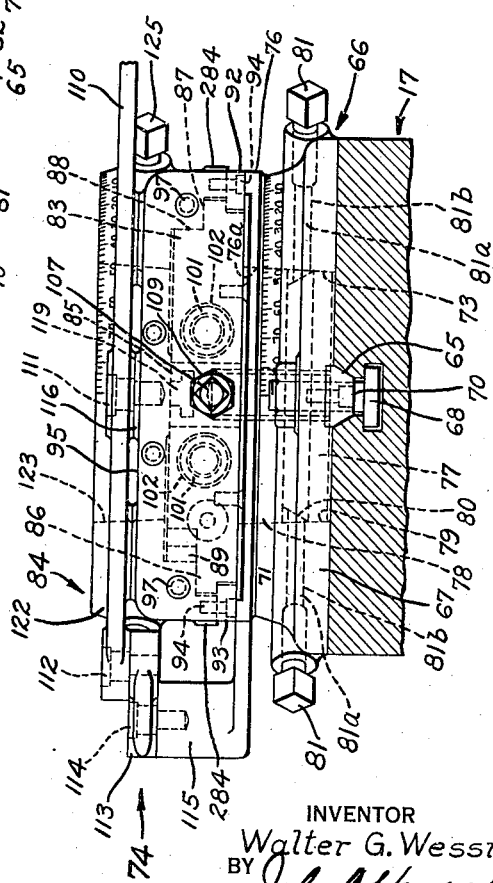
Fig. 15 is an end elevational view of said slide the view being taken as looking from the left in Fig. 14.

Coil springs 101 disposed in sockets 102 in the swivel slide 83 bear against rods or plungers 103 bearing against the end piece 95 and constantly tend to maintain the slide part 84 in the positions of Figs. 13, 14 and 15. A screw 104 adjustable through end 96 is adapted to engage a stop projection 105 on the swivel slide 83 whereby to limit movement of part 84 by said coil springs. A lock nut 106 is provided to secure said screw after any adjustment thereof. A second screw 107 is threaded through end piece 95 and is adjustable therethrough and is adapted to engage the adjacent end portion 108 of swivel slide 83 to limit movement of part 84 on said swivel slide in opposition to the coil springs 101. Screw 107 is provided with a lock or jam nut 109 for securing it in adjusted position.

Means are provided for manually moving the slide part 84 against the tendency of the coil springs 101 and as will later appear the slide with slight modifications is adapted to be moved by a cam against the tendency of said springs when the slide is used in a profile grinding operation. The manual means includes a lever 110 pivoted intermediate its ends at 111 and at one end pivoted at 112 to the free end of a link 113 which in turn is anchored by a pivot 114 on a lug 115 supported by and disposed laterally of the bottom plate 76 of the slide.

Pivot 111 enters a slight boss 116 on one end portion of the upper slide of the slide part 84 and at opposite sides of said boss the part is provided with bearing surfaces 117. At times it is desirable to reverse the position of the lever 110 and to provide for the pivotal mounting of the lever at such times a boss 118 is provided on slide part 84 toward the end thereof opposite that at which the boss 116 is located.

With the described construction (see Fig. 13) it will be clear that on pulling of the free end of lever 110 toward the right the slide part 84 will be moved on swivel slide 83 in opposition to the coil springs 101 compressing the latter between the forward ends of the plungers 103 and the inner ends of the sockets 102. On release of the pressure on the lever the springs will act to return slide part 84 to normal position with screw 104 against stop 105. The swivel slide part 84 of each slide is provided on each longitudinal edge with a finished surface 284 against which a "sine bar" or the like may be used when adjusting the slide to various angular relationships with the table 17.

When the slides are used in multiple, as in the present instance where slide 75 is mounted on slide 74, it is sometimes necessary or at least desirable to lock one slide against any casual movement while the other slide is being manipulated. The reasons for this will later appear. To the desired end, it is noted that swivel slide 83 is provided with a central longitudinally extending inverted T slot 119 in which is located the head of a bolt 120 extending through the upper side of the slide part 84 and there provided with a nut 121. Clearly bolt 120 is movable with slide part 84 and this part may be secured in fixed relation to the swivel slide 83 on tightening of the nut 121 to clamp part 84 against the bearing surface portion 85 of swivel slide 83. The nut may be tightened to secure the parts against relative movement with the head of bolt 120 in any position of adjustment along the length of the slot 119.

Slide part 84 is built up centrally on its upper side providing a portion 122 having a tapered opening or socket 123 therein and corresponding exactly with the socket 73 in the base member 66. About its outer edge portion 122 is graduated as shown at 124 in the manner described in connection with the graduations of the part 66. Socket 123 is for the reception of the projection 77 of another slide or a similar projection on another part as will appear. For the purpose of securing any such projection in the socket and clamping any additional slide or other part against the upper edge of portion 122 four bolts 125 are threaded radially through such portion 122 and these bolts are to function with pins 125a as and for the purpose set forth when considering bolts 81 and pins 81a.

Mounted on slide 75 is a work head generally designated 126 shown more particularly in Figs. 7, 8, 9, 10, 11, and 12 and comprising a body portion 127 having a lower annular flange-like portion 128. Centrally from the lower side of portion 128 and concentric therewith depends a projection 129 of the shape, size and construction of the projection 77 at the under side of slide 74 above described. Projection 129 has the upper and lower annular bearing surfaces 130 and 131 and the inclined surface portion 132 corresponding with the portions 78, 79 and 80 respectively of the projection 77.

In the present instance projection 129 is located in the socket 123 opening through the upper side of the slide 75 and is clamped therein by the radially extending bolts 125 of said slide whereby the head 126 is mounted on said slide 75. Head 126 is turnably adjustable relative to slide 75 on loosening of screws or bolts 125 and flange 128 of the head is provided with a mark 133 to be used in reading the graduations 124 about the upper outer edge of the raised portion 122 of the movable part of said slide.

Mounted on the upper side of body 127 is an electric motor 134. Said body is bifurcated in its upper portion whereby it comprises spaced sleeve-like portions 135 and 136. Internally sleeves 135 and 136 are tapered whereby they are of greatest diameter toward their outer ends and in each sleeve is an externally tapered bearing member, such members being numbered 137 and 138 respectively. Mounted by the bearings 137 and 138 is a hardened, ground and seasoned spindle 139 at its forward end mounting a chuck 140 for holding work 141. A quill 142 extends through the spindle 139 and at the end thereof opposite said chuck is provided with a hand wheel or the like 143 for manipulating the quill to thereby open and close the chuck 140.

Externally tapered bearings 137 and 138 are longitudinally adjustable in the sleeve 135 and 136 to compensate for wear. At its outer or forward end bearing 138 abuts against a radial enlargement or flange 144 on the spindle and a collar 145 backed by a threaded nut 145a on the spindle abuts against the outer or rear end portion of the bearing 137. Each of said bearings is externally threaded toward each of its ends. An annular member or nut 146 is threaded onto the outer end of bearing 138 and abuts against the forward end of sleeve 136 and includes a flange 147 extending inwardly over the flange 144 on the spindle. This nut anchors the bearing 138 and in addition serves to assist in excluding dust and the like from entering between the bearing and the sleeve and the bearing and the spindle.

In the bifurcation of the body 127 are a pair of ring nuts 148 and 149 of which the former is threaded onto the inner end of bearing 138 and abuts against the inner end of the sleeve 136. Nut 149 is threaded onto the inner end of bearing 137 and abuts against the inner end of sleeve 135. In addition nut 148 is provided in a side with an annular recess 150 into which enters an annular bead 151 on the side of the nut 149. A washer 152 of paper or other compressible material is located in the groove 150 and is somewhat compressed therein by the bead 151. With this interlocking arrangement the entrance of dust and the like to the spindle between the nuts 148 and 149 is prevented.

A nut 153 is threaded onto the outer or rear end portion of bearing 137 and abuts against the outer or rear end of the sleeve 135. With the described construction it will be seen that on loosening of nuts 146 and 153 and corresponding tightening of nuts 148 and 149 respectively the bearings 137 and 138 may be drawn inwardly in the sleeves 136 and 135 to compensate for any wear. Further with the described construction it will be understood that provision has been made for the exclusion of dirt and dust from the spindle. As shown the various ring nuts are provided with spaced openings for engagement by a spanner wrench or other tool to be used in turning the same.

As an additional precaution each of the bearings 137 and 138 is provided internally on the spindle bearing surfaces with right and left hand spiraled oil grooves 154 (see Fig. 12) so arranged as to feed oil toward the ends of the bearings as the spindle is revolved. This will serve to wash or flush some oil out over the flange 144. As the oil washes outwardly the inward movement of dust or the like will be effectively prevented. Oil may be supplied to the spindle in any suitable manner. Pins 155 are provided in the sleeve like portions 135 and 136 and engage longitudinal slots 155a in the bearings permitting longitudinal and preventing rotational movement when adjusting the ring nuts 146, 148, 149 and 153.

A bracket 156 is secured to body 127 as by bolts 157 passing through longitudinally extending slots 158 in said bracket. With this arrangement it will be clear that, within the limits of the lengths of the slots, the bracket 156 may be adjusted relative to the body 127. At its rear end the bracket 156 supports a bearing means 159 rotatably supporting a shaft 160 having stepped pulleys 161 and 162 fixed thereto to turn therewith. On the shaft of motor 134 is a stepped pulley 163 and a belt 164 drives the pulley 161 from the pulley 163.

Fixed on the rear end portion of spindle 139 is a stepped pulley 165 and a belt 166 drives said stepped pulley 165 from the stepped pulley 162 on the shaft with the pulley 161. Thus it will be seen that motor 134 drives the spindle 139 and the chuck 140. By shifting the belts 164 and 166 to different steps of the pulleys various speeds may be imparted to said spindle and chuck. Any slack in the belts may be taken up by adjusting the bracket 156 to carry the pulleys 161 and 162 away from the pulleys 163 and 165 and by sliding the motor 134 along slots 134a in the motor base either toward or away from the pulley 161 as is required to complete adjustment and finally securing the motor in position by bolts 134b. A control switch S is mounted on the forward portion of bracket 156.

Means are provided for holding the spindle 139 and the chuck 140 against turning movement while using the handwheel 143 with standard drawback chucks or when using a spanner wrench to loosen or tighten the work 141 through a chucking ring 140a which is necessary for larger work. As shown the chuck 140 is slidably keyed by 140b to the spindle 139 in order to make parts 165, 139, and 140 turn with one another. Pulley 165, fixed to the spindle, is provided with a series of openings or sockets 167 in its inner side. To an extension 168 of the sleeve 135 bolts 169 secure a small bracket 170 slidably mounting a lock-bolt 171 having an end portion 172 adapted to enter any of the sockets 167 in the pulley. A coil spring 173 tends to maintain said lock-bolt in a retracted position against an eccentric shaft 174 to the outer end of which is fixed a hub 175 carrying a cross pin or hand piece 176.

On turning of this hand piece in either direction the bolt 171 is projected to have its end portion 172 enter one of the sockets 167 to thereby lock the pulley 165 and the other parts against turning movement while the chucking ring 140a is being manipulated. When the eccentric shaft 174 is turned to a dead center position along the line of action of bolt 171 the spring 173 is ineffective to retract the bolt. After an adjustment has been made the hand piece is manipulated to retract the bolt. As shaft 174 is moved back from a dead center position the spring becomes effective and completes return movement of the bolt, freeing the pulley, and retaining the bolt in retracted position out of the way of the pulley. At the left hand end of the bearing 137 an annular ring 153a and a flange 153b extending outwardly are secured as by means of a screw 153c to the nut 153. The ring 153a and the flange 153b enter a counter-bore 165a in the pulley 165. With this overlapping arrangement and a small amount of oil seepage from the end bearing 137 past the flange 153b to the bottom surface of the revolving counterbore 165a an effective seal is formed for the rotating bearing surfaces located within.

In many instances the slide 75 will be identical with the slide 74. However, as here shown slide 75 is slightly modified since it is being used for profile grinding. The modifications will be clear from Fig. 16 wherein it will be noted that the stop bolts 104 and 107 have been omitted and that a cam roller 177 has replaced bolt 107 and that in the place of bolt 104 another stud 178 has been threaded into or otherwise attached to the projection 105 of the swivel slide 83 and passes outwardly of the slide through its end 96. On the outer portion of stud 178 is a nut 179 adjustable on the stud to limit movement of the slide. The purpose of this construction will appear in detail but here it is noted that as the slide part 84 is moved on the swivel slide 83 by engagement of roller 177 with a cam or otherwise, the stud 178 remains stationary with swivel slide 83 and 84 moves outwardly toward nut 179. At the extreme of the movement 179 may be tightened against the said end piece of the movable slide part and the latter held against the nut by lever 110 as the table 17 is fed back by lever means 20. This limitation of movement of 84 by nut 179 prevents the slide being moved to such extent as to bring the other side of the work against the grinding wheel and as the part 84 is held against the nut by lever 110 the work is held away from the grinding wheel during return movement of table 17. Thus all grinding may be done on the one stroke of the table and any back lash or play in the parts will always be in the same direction.

On the bed 12 rearwardly of the head 126 is a raised support 180 disposed on a surface 181 along which it is adjustable. In said surface is a V—T slot 182 receiving the heads of inverted T-bolts 183 passing through the base 184 of said support 180 and also receiving elongated keys 185 as shown best in Fig. 4. Fixed on the upper side of support 180 is any suitable cam 186. This cam is adjustably and removably secured on the support. Thus, the cam is provided with elongated slots 187 through which pass bolts 188 also threaded in the support.

Suitable dust screens or covers 189 and 190 are disposed above the cam 186 and between the underside of the cam mounting portion of support 180 and the adjacent end portion of slide 75. On loosening of bolts 188 the cam 186 may be adjusted on the support 180 and on loosening of bolts 183 the said support may be bodily adjusted along the surface 181 being guided by the V—T slot 182.

Toward one end, (see Figs. 1, 2, 3, and 6) the machine bed is provided with transversely or forwardly and rearwardly extending ways 191 located in a plane slightly below that of the forward portion 192 of said end of the bed. Slidable on the ways 191 is a carriage generally designated 193 and comprising a base portion 194 having an undercut or dove-tail portion 195 movable in the ways. An adjustable gib 196 is provided in the ways between the slide or carriage 193 and the bed 12. Said gib is provided with adjusting screws 196a threaded in and through the dove-tail way 191 in the bed 12 to take up any play caused by wear of the dove-tail surfaces.

Carriage 193 is of some height and includes an upper forwardly directed horn-like portion 197 under which the table 17 may pass. In its entire upper side including said horn-like portion carriage 193 is provided with a V—T slot 198 extending for the length of said upper portion. Means are provided for adjusting the carriage 193 forwardly and rearwardly on the ways 191 and as here shown a shaft 199 has bearings in the walls of the bed portion 192 and entering a channel in the dove-tail portion 195 is threaded into a lug 200 depending into said channel and rigid with the said carriage. On the outer end of shaft 199 is fastened a hand wheel 201 by means of which the shaft may be rotated in either direction to feed the carriage 193 forwardly or rearwardly along the ways 191.

The lower edges of the carriage 193 are provided with end covers 193a, 193b and side covers 193c which are secured by means of screws 193d and 193e to said carriage, these covers act as dust and grit obstructions thereby aiding to keep clean the dovetail bearing surface of the ways 191, 195 and gib 196. Cover 193a is provided with an annular opening to allow the threaded shaft 199 entrance to the channel in the dovetail to engage threaded lug 200.

Rotatably mounted on a hub-like portion of wheel 201 is a collar-like member 202 having graduations thereon as shown and which graduations are adapted to be read in connection with a mark 203 on the bed. Preferably a screw 204 fixes the collar 202 to the hub of the wheel 201 in a desired position of adjustment for ease of the reading of the graduations in connection with mark 203. The collar may be adjusted to have the parts arranged so that any graduation is either the start or stopping point for movement of the wheel for some particular work to be performed.

Mounted on the upper side of the carriage 193 for adjustment relative thereto and for movement therewith is a tool head generally designated 205 including a base 206 through the end portions of which pass bolts 207 having the heads disposed in the inverted T-shaped portions of the slot 198. Such bolts also pass through elongated keys 208 entering partly into the base 206 and partly into the V-shaped portion of the slot 198.

Clearly on tightening of the nuts on the upper ends of the bolts 207 the keys 208 are drawn into the said V-shaped portions of slot 198 and the base 206 secured in place. Thus on loosening of the bolts 207 the base 206 (and all parts mounted thereon as will appear) may be shifted along the upper side of the carriage 193 to the desired position of adjustment after which the bolts are tightened to secure the base in position against any casual movement relative to the carriage.

A raised body portion 209 on base 206 has a tapered socket 210 opening through its upper side and on an outer side is provided with a mark 211 adapted to be read in connection with certain graduations as will appear. Radially extending bolts 212 are threaded in the body 209, said bolts are similar to bolts 81 and act against pins (not shown) entering the socket 210 to secure a projection therein. Mounted on body 209 is a slide generally designated 213 (see Figs. 1, 3 and 5) and comprising an annular projection 214 of the size and construction of the projection 77 and 129 above described and received in the socket 210 as shown.

The bolts 212 when tightened force the inclined inner ends of pins (not shown) to engage the inclined portion 215 of said projection 214 whereby to draw the flat underside of an annular portion 216 (shown as integral with the projection) against the upper edge or side of the body 209. In this way portion 216 and the means and parts mounted thereon are secured against casual movement relative to the said body 209 and its base 206. On loosening of bolts 212 the projection 214 and the annular portion 216 may be turned relative to body 209 and such annular portion is shown as provided with graduations to be read in connection with the zero or starting mark 211 above mentioned.

On the upper side of annular portion 216 and integral therewith is a body 217 having a longitudinal recess 218 undercut on its opposite sides as at 219 providing dovetail ways. On the body 217 is a slide 220 resting on spaced surfaces 221 and having side portions 222 undercut at their outer edges for cooperation with the ways 219. Slide 220 is provided with a longitudinally extending channel 223 opening through its underside. Secured to the upper side of the body 217 and projecting into said channel are spaced members 224 and 225 (see Fig. 5) into the former of which is threaded a feed screw 226 while the latter supports a bar 227 extending in the direction of said screw and said channel.

Members 224 and 225 are secured to the body 217 in any suitable manner and in the drawings they are shown as being held in place by screws. Slide 220 includes end members 228 and 229 as well as side skirt-like portions 230 acting to exclude dust and the like from the ways 219 and from between the engaging portion of the slide 220 and the body 217. Screw 226 includes an unthreaded portion 231 turnable in a wall of the slide 220 and in the end member 229 thereof and held against movement through such wall by a collar 232 and the hub of a handwheel 233 fast with the outer end portion of the screw.

About the hub of said hand wheel is a collar 234 provided with graduations adapted to be read in connection with an index mark 235 on the top of end member 229 and which collar is adjustably held in position by a set screw or the like 236. It will now be understood that on turning of the hand wheel 233 the screw 226 will be turned in the member 224 which comprises a nut, and the said screw being held against relative longitudinal movement with the slide 220 the latter will be fed on the body 217, moving along the ways 219. Thus slide 220 may be adjusted on the body 217.

A bolt 237 passes laterally through the slide 220 and is movable with said slide when the latter is fed along the ways 219. At its outer end this bolt includes a head-like portion 238 comprising a hand piece or knob by means of which the bolt may be turned. At its inner end the bolt is threaded into the split portion 239 of a lock-lug 240 through which the bar 227 passes. As the lug 240 is split through from its portion receiving the bar 227 to its upper edge it will be clear that when said split portion is open the bar 227 may pass freely through the lug as the latter is moved with the slide 220.

However, on tightening of bolt 237 the split portions of the lug are drawn toward one another and the said lug pinches on the bar 227 securely holding it against movement through the lug. Since the said lug is movable with slide 220 when the latter is being adjusted by manipulation of wheel 233 it will be seen that on tightening of bolt 237 to have its lug 240 clamp the bar 227 the slide 220 will be locked against movement relative to body 217, it being borne in mind that the said bar 227 is held by the member 225 and that the latter is secured to the body 217.

Slide 220 has a raised annular portion 241 and stop lugs 242 and 243 located at spaced points radially of said annular portion. Centrally portion 241 is provided with an annular socket 244 opening through its upper side and of a size and shape to turnably receive an annular projection 245 of the size, shape and construction of the projections 77, 129, and 214 above described. Radially extending bolts 246 (Fig. 3) are threaded in the raised annular portion 241. Said bolts have inner flat ends bearing on similar ends of binder pins (not shown) entering the socket 244 to be tightened against the inclined surface portion of the projection 245. In this way the projection is drawn into socket 244 and a flange or plate-like portion 247 integral with said projection is drawn against the upper end of said raised portion 241 whereby to secure said projection and flange against movement relative to the slide 220.

On the upper side of flange 247 is an annular projection 248 of the same diameter as the projection 245 but as shown not provided with the inclined surface for engagement by radially disposed bolts as in the case of projection 245. Disposed on the raised portion 241, flange 247 and projection 248 is a base member 249 including a body 250 and an annular flange 251 of considerably larger diameter than said raised annular portion 241. Body 250 has an annular socket 252 opening through its lower or inner side and receiving the projection 248 whereby the body is turnable about said projection as a center.

Flange 251 is provided with a pair of arcuate slots 253 in which are mounted bolts 254 and 255 adjustable along said slots and following adjustment adapted to be secured in position on tightening of the nuts 256. The stop lugs 242 and 243 are disposed in the paths of movements of the heads of the bolts 254 and 255 respectively and it will be clear that depending on the positions of the bolts in the slots 253 the turning movement of base member 249 on the projection 248 is limited.

Body 250 includes or mounts a spindle quill receiving means 257 in which is located the spindle quill member 258 mounting the spindle 259 to the forward end of which is detachably connected the shank 260 of a grinding wheel 261. On the upper portion of a bracket-like extension 262 of the body 250 is supported a bracket 263 secured in place by a bolt 264 and mounting an electric motor 265 shown as bolted to the said bracket but which may be secured thereto in any desired manner. A belt 266 enclosed in a housing or guard 267 is trained over pulleys 268 and 269 on the shaft of motor 265 and the spindle 259 respectively whereby said motor drives said spindle. Housing 267 is adjustably supported on a bracket or plate 270 carried on the outer end of a rod or arm 271 secured to bracket extension 262 by a bolt 272.

A vertical annular bushing 273 rigid with the body 250 passes downwardly therethrough and through said bushing passes a bolt 274 having its lower or inner end threaded into the projection 248. A handle 275 is provided for tightening and loosening of the bolt 274 and on tightening of said bolt the body 250 is drawn downwardly on projection 248 and flange 247 whereby said projection is tended to be moved more into the socket 252 in said body thus clamping the body and all parts carried thereby or mounted thereon against turning movement on said projection 248 and flange 247. Clearly the bolt 274 is concentric with such projection 248, socket 252 and bushing 273. On manipulation of handle 275 to loosen the bolt 274 the body 250 and parts carried thereby or mounted thereon may be turned with said bolt as an axis or center, a handle 276 being provided for such purpose. In use of the machine the bolts 254 and 255 in the arcuate slots 253 by engagement with the stop lugs 242 and 243 control the extent of turning movement of body 250 on projection 248.

In addition the bracket extension 262 is pivotally mounted on the bushing 273 and is locked in any radial position relative to said bushing by means of a binder bolt 262a.

A pair of depending lugs 277 on the table 17 mount a bar 278 extending in the direction of the length of said table. This bar passes through an opening in a clamp means or block 279 which is split at 280 through to its upper edge from the bar receiving opening. Threaded into the inner split portion of block 279 is the inner end of a bolt 281 extending to the outer forward side of the machine bed 12 and there provided with knob 282 for manual manipulation. On tightening of bolt 281 the split portions of the block 279 are drawn toward one another somewhat closing the opening receiving the bar 278 whereby the block pinches against or clamps said bar. Thus on tightening of the bolt 281 the bar 278 is clamped and being rigid with the table 17 the bar and thus the table are locked against movement.

The present lock therefore provides means whereby following any adjustment of the table 17 the same may be locked in adjusted position against all casual movement. In addition attention is directed to the fact that as the split portions of the block 279 are drawn toward one another at the upper side of the bar 278 the tendency is to force said bar downwardly. This results in a tendency to clamp the entire table 17 downwardly whereby the V block 18 of said table is drawn further into the corresponding V groove in the bed 12 and the table locked in position without the slightest lateral or longitudinal displacement.

Figs. 18 through 23 illustrate the invention as incorporated in a bench type machine and such machine includes the work head 126 previously described and the tool head 205 also previously described. Where the parts in Figs. 18 through 23 are the same as in Figs. 1 through 17 they have been given the same reference characters. The bench type machine includes a base generally designated 285 adapted to be mounted and secured on a bench or other support available. This base is in the form of a one piece casting and includes front and rear parallel supporting surfaces 286 and 287 and at one end a transverse supporting surface 288.

Surface 286 has opening therethrough a V—T slot 289 for use in securing the work head 126 in adjusted position on said surface as fully set forth when considering the first or pedestal type machine. The cam supporting or mounting member 189 is secured on the surface 287 and the latter is provided with a V—T slot 290 opening therethrough for use in securing such member in adjusted position along the length of said surface by the bolts 183 and keys 185.

The end or transverse surface portion 288 is provided with a V—T slot 291 opening through its upper surface and mounted on such surface is a base member 292 through the end portions of which extend bolts 293 having their heads located in the inverted T-shaped portions of said slot.

About said bolts and entering partly into the V-shaped portions of slot 291 are elongated keys 294 adapted to be drawn tight against the sides of such V-shaped portions of the slots when the bolts are tightened whereby the base member 292 will be securely held in adjusted position. Clearly on loosening of the bolts 293 the base member 292 may be adjusted along the surface 288.

In its upper side the base member 292 is provided with a groove of considerable width and having undercut sides providing dove-tailed ways 295 receiving the corresponding portions 195 on the under side of a carriage 193d corresponding in purpose with carriage 193 above described. Thus in the modification the ways 295 in adjustable base 292 correspond with the ways 191 in the bed of the machine first described.

While below detailed descriptions of the use of the machine of the invention in connection with several types of work or on several jobs is set forth it is desired here to point out the various adjustments, motions, etc., which may be made and through which the machine may be manipulated. First in Figs. 1 through 17 it will be clear that the table 17 is longitudinally adjustable on the bed 12, that the slide 74 is swivelly adjustable on the table and also that on loosening of nut 121 the slide may be moved relative to the table by manipulation of its handle 110.

Similarly slide 75 is swivelly adjustable on slide 74 and on loosening of nut 121 of slide 75 the latter may be shifted, as by a reciprocating motion relative to slide 74. This requires manipulation of the handle 110 of slide 75. Also attention is directed to the fact that slide 75 may be moved in one direction automatically by the profile cam 186 and in such event its return motion may be imparted by the coil springs 101 above described.

Thus the work head 126 in addition to two swivel adjustments may be given all or any of three sliding motions. In any adjusted position the work head may be locked as by screws 81 and 125 nuts 69 and 121 and the clamping means actuated by knob 282. The sliding adjustments may be in the nature of reciprocating motions, as on movement of table 17 and manipulation of slides 74 and 75. Owing to the swivel adjustments the sliding motions imparted to the tool head may be in any relation to the table from paths parallel with said table to paths at right angles thereto.

Further it is noted that the work head is adjustable along the table 17. On loosening of nuts 69 the work head may be adjusted along the length of the V—T slot 65 in the upper surface of table 17. This adjustment is made depending on the length of a piece of work so that the table or slides may be given but the necessary minimum stroke for a given piece of work.

The tool head 205 is adjustable forwardly and rearwardly on the carriage 197 on loosening of nuts on the upper ends of bolts 207. In addition the tool head being mounted on said carriage is movable therewith on manipulation of the hand wheel 201. Further a swivel adjustment of the tool head may be made on loosening of screws 212. It may be shifted from engagement of bolt 254 with stop 242 and bolt 255 with stop 243 on loosening of bolt 274 by manipulation of handle 275.

Hand wheel 233 and its associated mechanism provides for an additional adjustment of the tool head and this means is usually employed for making an adjustment to compensate for wheel wear. The making of any adjustment by manipulation of wheel 233 requires that first the knob 238 be operated to bring about the release of the rod or bar 227 rigid with the movable slide 213. On loosening of the radially disposed screws 246 the second swivel adjustment of the tool head may be made this time independent of any adjustment of the slide 213 operated by the hand wheel 233.

In the bench type machine of Figs. 18 through 22 the adjustments and possible movements of the work head and toolhead are substantially the same as those of the pedestal type machine of Figs. 1 through 17. However, in the bench type machine there is no part equivalent to the table 17 although the work head may be adjusted longitudinally of the base 285 along the V—T slot 289 thereof. The tool head 205 of the bench type machine is adjustable transversely of the base 285 along a V—T slot 291 in the upper side of the base rather than in the upper side of a carriage as in Figs. 1 through 17.

Thus in this modification the carriage 193d is itself adjustable along the slot 291 and is secured in adjusted position by the clamping nuts on the upper ends of bolts 293. Following any such adjustment the carriage is adapted to be fed transversely of the machine by manipulation of the hand wheel 201 whereby to feed movable carriage 193d on the ways 295. The two swivel adjustments possible in the work head provide for location of the grinding wheel in the desired angular relation to table 17 or to the center line of the latter. The various other adjustments of the tool head are those already described in connection with the first figures of the drawings.

The present machine is especially designed for grinding of intricate pieces of work involving angularly related and/or curved surfaces without change of set up from one surface to another and without the use of formed grinding wheels. To finish any surface it is readily apparent that either the tool or work must move parallel to said surface. Ordinarily on angular surfaces this is accomplished by setting and securing the work at an angle to the longitudinal movement of a table and the latter is moved carrying a face of the work across a stationary grinding wheel or the latter is set on a movable table and is carried across a stationary piece of work set an an angle. To finish work having more than one angular surface and using either of these methods necessitates resetting the work or adjusting the machine for each face each time each piece of work is ground and requires the continuous attention of a highly skilled man.

To finish angular faces with my machine the work is held in a swivelly mounted work head carried by a swivelly mounted slide or a combination of swivelly mounted slides mounted one on the other. Said slides are set at various angles to each other, depending on the angular relation of the surfaces to be ground, and each slide provides for movement of the work or grinder parallel to a surface required to be finished. The slides may be set at right angles to each other with the upper slide bearing against a fixed profile cam and the lower slide providing for longitudinal movement at right angles to that provided for by the upper cam engaging slide. These combinations when brought against a relatively stationary grinding wheel or when used to move the grinding wheel to bring it against relatively stationary work, produce multiple angle grinding and profile grinding respectively.

With my machine a relatively skilled mechanic sets up the machine at one time to finish all the various angular surfaces of a piece of work and once the set up is established it is maintained to reproduce the part with but little adjustment of the grinding wheel and gauging of the work by an unskilled operator. Thus once the highly skilled mechanic has made the desired set up on a machine for a given piece of work he will be used on some other job requiring his skill. By reducing the skilled man hours and the loss of production due to resetting the machine for each surface to be ground and using unskilled labor the cost of production is greatly reduced.

The machine as herein disclosed is adapted for both internal and external straight, angle, multiple angle and profile grinding. A number of different parts, operations to be performed thereon and a general sequence of these operations are below described. However, it is to be understood that the invention is not limited by this description. The operations need not be those specifically herein set forth and I may vary the sequences of operations as required for any particular job.

In Fig. 24 is shown a punch generally designated 286 and having a flat or shoulder surface 297, a straight annular and and annular angular body 298 and 299, respectively, and an annular surface 301a of varying diameter comprising the surfaces to be ground. The punch is securely and accurately held around its head 300 by the rotatably mounted chuck 140. A grinding wheel 301 mounted on the shank 269 is set up parallel to the rotating center line of the chuck 140. This initial set up in relation to tool head 205 is similar to that shown in Fig. 2. There it is seen that when shank 269 is parallel to chuck 140 and the longitudinal center of table 17, the arcuate slots 253 in the annular flange 251 and radially disposed stop lugs 242 and 243 on slide 220 equally straddle the longitudinal center of carriage 193 when the index mark 211 on the raised portion 209 and the mid-graduation or zero point on the annular flange 216 register.

The work rotating with the chuck may be held in fixed position as regards longitudinal and transverse movement relative to bed 12. These movements however are imparted to the rotating work in multiple angle grinding or a combination of said movements are used in profile grinding.

However, in the following explanations the rotating tool will be considered in fixed position relative to the bed 12 and the work will be considered as being moved relative to the rotating grinding wheel. Considering the base 66 as properly adjusted and secured longitudinally of table 17 to allow for adequate movements of the various elements and the said elements as properly set and secured in position, the operator closes the motor switches and brings the rotating grinding wheel to bear on the rotating work surfaces by manipulation of the hand wheel 201 moving carriage 193 and tool head 205 therewith either forwardly or rearwardly transversely of the machine bed.

After adjustment of the carriage 193 the knob 282 is manipulated to release table 17 and block 48 and screw 49 are adjusted against a spacer or gauge or rod interposed between said screw and stop lug 50 to regulate the longitudinal movement of the table in a direction carrying the work 296 along the grinding wheel 301 to grind the surface 301a. This movement is represented by the line a—b in Fig. 25.

The reciprocating motion of the work 296 and the table 17 along such line a—b relative to the grinding wheel is obtained through the sprockets and chains described above on rotation of the lever means 20 clock-wise and counter clock-wise. Additional adjustments of the carriage 193, screw 49 or compound slide are made to compensate for wheel wear as may be required until the desired diameter of work portion 301a is obtained. As table 17 is moved longitudinally along the bed 12 slide 75 moves transversely with its cam roller 177 following the contour of a suitably curved cam to form the curved surface 301a.

Next when screw 49 on table 17 engages the gauge block or rod interposed between said screw, at the operator's left, and stop lug 50 knob 282 is tightened as is nut 121 on slide 75 and said gauge block or rod is removed. Nut 121 on slide 74 is loosened, said slide having been pre-set (the slides may be set from the graduations 124 or a sine bar may be attached to the finished strips 284 and indicated by an indicator secured in T-slots shown at 302 and 303 in Figs. 2 and 21 respectively) at an angle corresponding to surface 299 its handle 110 is manipulated bringing work face 299 along the grinding wheel. This movement is represented by the line b—c in Fig. 25. Movement of said slide is limited in one direction by screw 104 engaging projection 108 thus preventing the wheel 301 from biting into work surface 301a.

Surface 299 having been finished nut 121 on slide 74 is locked and knob 282 is released whereupon table 17 is moved along to the right while wheel 301 finishes surface 298. Such movement is represented by the line c—d in Fig. 25 and movement of the table is limited by engagement of stop screw 49 with lug 50.

When surface 298 has been finished and the parts are in the last described positions knob 282 is locked and nut 121 on slide 75 is unlocked. Now the handle 110 on slide 75 is drawn toward the operator bringing the wheel 301 across surface 297. This movement is represented by the line d—e in Fig. 25. Upon completion of surface 297 the nut 121 on slide 75 is again tightened, knob 282 is loosened and table 17 moved back to the left as represented by the line e—a in Fig. 25. Then the finished work is replaced by an unfinished piece and the described cycle of operations may be started again. Thus production becomes semi-automatic.

Fig. 26 shows a part 304 such as a circular forming tool or the like having angular surfaces 305, 306 and 307 to be ground. The part is held against a flat surface 311 as by an expanding chuck 309 and an expanding screw 310. A regular annular grinding wheel 312 is mounted on shank 260. Slide 74 is set away from the operator at an angle parallel to surface 305, slide 75 is set toward the operator at an angle parallel to surface 307 and the work and work head are set parallel to the direction of movement of table 17. Base 66 is adjusted and secured in position to allow for movements of the various elements or parts through a complete cycle of operation and with the various locating elements positioned and locked against casual movement.

Next the operator loosens bolt 274 by manipulation of handle 275 and swings the tool head 205 with the wheel 312 positioned forwardly until the bolt 255 and lug 243 contact bringing the face of the grinding wheel parallel to the angular surface 305. Then handle 275 is operated to tighten bolt 274 thus securing the tool head. Carriage 193 is adjusted, knob 282 loosened and table 17 is moved to the right to contact the work with the grinding wheel. Then knob 282 is tightened securing the table. Nut 121 on slide 74 is loosened and said slide given a reciprocating motion by manipulation of its lever 110. This motion is clearly imparted to the work head carrying the work surface 305 against the wheel 312 for finishing said surface. Movement of the work relative to the grinding wheel is indicated by the line f—g in Fig. 27.

Upon finishing surface 305 the movable portion 84 of slide 74 is returned to the left end of its movement and such movement is limited by the stop screw 104. Then nut 121 is tightened locking said slide against casual movement. In addition knob 282 is loosened and table 17 returned to the left. The operator now loosens bolt 274 and swings the tool head 205 and wheel 312 rearwardly using bolts 254 and lugs 242 to limit such swinging movement he brings the grinding wheel (now designated 312a in Fig. 26 and which may be the same or a different wheel) into cutting relation with the straight annular face 306 and with shank 260a parallel to the rotating center of chuck 309 after which the bolt 274 is again tightened.

Carriage 193 is then adjusted and table 17 is moved over contacting surface 306 with the wheel 312a. Such movement is a reciprocating movement and is of a length to have the leading edge or leading corner edge 312b of the wheel reach the point 312d on the work. The described movement is indicated by the line g—h in Fig. 27. Screw 49 on the left hand side of the table engages the lug 50 to limit the movement and when surface 306 is finished and screw 49 is against lug 50 the knob 282 is tightened and nut 121 on slide 75 is loosened. Then slide 75 having been pre-set to give a motion parallel with surface 307 as indicated by the line h—j in Fig. 27, the slide is reciprocated passing surface 307 over the grinding wheel. Movement of the slide is limited by screw 107 so that the wheel 312c does not dig into the surface 306 when the wheel is passed back over the surface 307.

As surface 307 is brought across the corner 312b of the wheel such edge is worn away forming a bevel edge 312e upon a wheel 312c whereupon the knob 238 on slide 213 is loosened and said slide is moved over by means of wheel 233 to compensate for said wear. After said adjustment knob 238 is tightened and when surface 307 is completed knob 282 is loosened, table 17 is returned to the left and the movable portion 84 of slide 75 is returned to its initial position, nut 121 on said slide is tightened and the machine is then ready for unloading, loading and the repeating of the described cycle.

In Fig. 28 is shown a die, mold or the like 313 having straight annular surfaces 314 and 316 and an intermediate annular surface 315 of varying diameter. These three surfaces are to be ground and the die is shown as held by the chuck 140. A standard grinding wheel 261 is mounted on shank 260. Slide 75 is set so that its longitudinal movement is transverse to the bed 12 and table 17.

Base 66 and cam support 180 are located and secured in their proper respective positions along the table 17 and bed 12 respectively. The parts are positioned to allow for all necessary movements of the machine's elements when passing through a cycle of operation. The tool head 205 is brought into position with the grinding wheel located parallel with the rotating work and the direction of movement of table 17. Carriage 193 is adjusted to contact the grinding wheel with the inner surface 314 of the rotating work, this being the surface nearest the operator.

Next knob 282 is loosened and the table 17 moved to the right and reciprocated by the lever means 20. This results in reciprocation of the work head 126 in the direction of movement of the table and parallel with the slide 74. As the table 17 is reciprocated in the direction indicated the slide 75 is reciprocated in a direction transverse to said table due to the cam roller 177 following the profile cam 186. During the described movements of the work its surfaces 314, 315 and 316 are engaged by the grinding wheel and finished.

For the final or finishing cut a very light cut may be obtained without passing the work surface over the grinding wheel during the return part of the reciprocating movement of the work. This is accomplished by pulling the hand lever 110 of slide 75 toward the operator and against the pre-set nuts 179 during return movement of the work. As the said pre-set nuts limit movement of the slide by the hand lever the operator will not accidentally move the work such a distance as to bring its opposite side against the grinding wheel during such return movement.

It is to be noted that the face of the standard wheel 261 contacts the surface 314 first and then as the work moves along relative to the wheel the lower left hand edge 261a of the latter contacts the surface 315 of the work. This slightly forms the wheel along the contour of the die. The wheel is reformed to its original shape in grinding the surface 316 as shown at 261c. When additional adjustments or corrections are made necessary by wearing away of the grinding wheel such corrections or adjustments are made by loosening the head 238 of the clamping bolt 237 allowing the compound slide 213 to be moved, by turning of wheel 233, parallel to the work and table 17. Upon said movement being completed 213 is again locked in position by bolt 237.

The old method of grinding a contour surface as shown or a variation of said surface was to form a wheel of the shape and full length of the surface with a diamond and then rotating the formed grinding wheel against the surface to be ground. This is a highly expensive method requiring highly skilled men to form the grinding wheels which in themselves are costly and of short useful life. With the present machine standard wheels are purchased from a jobber and are used without alteration. This decreases cost of production.

Fig. 29 shows a pointing die, mold or the like 317 including straight annular surfaces 318 and 320 and an annular intermediate surface 319 of varying diameter. The die 317 is shown as held by the chuck 140 for the grinding of the mentioned surfaces. For grinding of die 317 a cam set up and procedure similar to that used for finishing die 313 is employed. The hole 321 is finished in the same set up as the surfaces 317 and 318 but hole 321 being of very small diameter its surface 320 is ground with a smaller diameter wheel than that used for grinding the surfaces 318 and 319. The reason for this is that the wheel used in hole 321 is of such small diameter as to wear out before it could complete the finishing of surfaces 318, 319 and 320.

Thus the using of wheels of larger diameter than hole 321 for the grinding of surfaces 318 and 319 becomes necessary. To form the wheel of the shape indicated by 261 I use a "carborundum" stick or a diamond and obtain a wheel of approximately the curve of the surface 319 before contacting the work. The straight and curved surfaces 318 and 319 of the work piece 317 are finished according to the profile cam and the hole 321 is finished independent thereof and after changing of the grinding wheel. This hole may be finished by a straight movement of the work such as will be obtained by movement of the slide 74 similar to a movement which may be employed for finishing surface 316.

Figure 30:
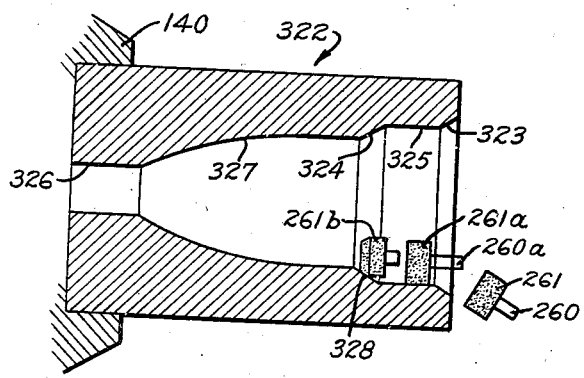
Fig. 30 is another sectional view illustrating a more complicated internal grinding job.

In Fig. 30 is shown a die, mold or the like 322 having annular angular surfaces 323 and 324, straight annular surfaces 325 and 326 and an annular surface 327 of varying diameter. Die 322 is shown as held in chuck 140. A standard annular grinding wheel 261 is mounted on the shank 260 and held by the tool head 205 pivotally mounted on the compound slide 213. Said compound slide being pivotally mounted on projection 209 is swung to bring shank 260 and the face of the grinding wheel 261 into parallel relation to the angular surface 323 required to be ground. The parts are located by means of graduations on the annular portion 216 and secured by tightening the radially disposed extension screws 212.

Upon loosening of bolt 237 and slide 213 with other parts set in position, surface 323 is finished by rotating the hand wheel 233 clockwise and counterclockwise moving compound 213 carrying wheel 261 back and forth until said surface is finished whereupon the grinding wheel is withdrawn. Next screws 212 are again loosened and wheel 261, shank 260, tool head 205 and slide 213 are swung back as a unit to a position where the zero graduation on the annular flange 216 registers with index mark 211 on the raised portion 209. The shank 260a and the face of wheel 261a (261a may be a different wheel from 261 but preferably no change of wheels is made and the numeral 261a is used for convenience of description) are now parallel to the surface 325 and the screws 212 are again tightened.

Knob 282 is loosened, table 17 is moved to the right with adjusting screw 49 engaging a gauge block or rod interposed between the adjusting screw 49 and the lug 50 thus limiting movement of the table 17. The latter is reciprocated longitudinally by manipulation of the lever means 20 and carries the work head which is set parallel to the direction of the table. Thus die 322 is reciprocated with its surface 325 engaging the grinding wheel. Upon finishing of the grinding of surface 325 the table 17 is moved to the right bringing screw 49 tightly against the interposed gauge block or rod and lug 50 and clamped in this position by manipulation of knob 282.

The nut 121 on slide 74 is loosened and said slide being previously properly set to travel at an angle to the table 17 equal to that of surface 324 is given a reciprocating motion through the hand lever 110 imparting such motion to the work 322 and grinding surface 324. It is noted that the lower left edge 328 of the grinding wheel 261b is engaged by the work surface 324 during the described reciprocating motion. Said edge is shown as having an annular angular form which is acquired by the wearing action of the wheel on the work. Adjustment of the compound slide 213 compensates for wheel wear. The forming of the wheel as described is an aid in finishing the surface 324 and as seen needs no special attention of the operator with the exception of the necessary adjustments of the compound slide 213 to compensate for wheel wear.

Figure 31:
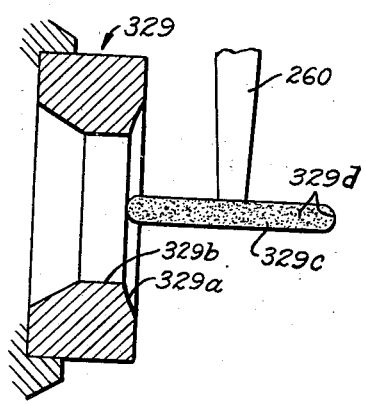
Fig. 31 is a detail sectional view illustrating a further adjustment of the machine of the invention.

The lever 110 of slide 74 is pulled toward the right bringing slide 74 and carrying the slide 75 and work head 126 to its extreme position as limited by the screw 107 of slide 74. This brings the transversely set slide 75 in line with the cam 186 and the roller 177 of said slide into contact with said cam. Then the nut 121 of slide 74 is tightened locking the latter in position after any necessary adjustments have been made to the compound slide 213 and carriage 193. Knob 282 is loosened and table 17 reciprocated carrying the work with it. The surfaces 327 and 326 of the work move over the grinding wheel while the cam roller 177 follows the profile of cam 186. Thus surfaces 326 and 327 are finished ground in the same reciprocating movement of the work head. Upon finishing the surfaces 327 and 326 knob 282 is tightened, handle 110 on slide 75 is drawn toward the operator as allowed by the pre-set nuts 179, whereupon the nut 121 of said slide is tightened. Knob 282 is again loosened and the table 17 moved over to the left carrying the work clear of the grinding wheel to reloading position. Now the finished work is removed and the chuck reloaded and the machine is ready to repeat the described cycle of operation. In Fig. 31 is shown a draw die, mold or the like 329 having a concave lead edge 329a at one end of an annular hole 329b. A grinding wheel 329c is selected having the desired proportions and its edge formed to the radius 329a. Bolt 274 is loosened and head 205 swung to position the flat side of the wheel parallel to the longitudinal axis of the table 17. Bolt 274 is now again tightened. Cam roller 177 is disengaged from cam 186 by pulling the lever 110 of slide 75 toward the operator and the slide is secured in this new position by tightening of its nut 121. Rather than move the slide 75 as described it may be swung about and secured in parallel relation with the table 17 and locked in place by bolts 125.

Base 66 is set and secured longitudinally of the table 17 to allow for adequate movement of the parts. The various parts being set and locked in position carriage 193 is adjusted to bring the center of the wheel 329c into line with the center of the work 329 and parallel to the table 17.

Either the slide 74 or the table 17 (or the slide 75 if it has been shifted into parallel relation with the table) may be unlocked and rapidly moved to the vicinity of the grinding wheel 329c and then locked in position. The compound slide 213 is now released on loosening of bolt 237 and then the slide is fed by turning of the hand wheel 233 bringing the rotating grinding wheel into contact with the revolving work 329.

When the surface 329a is ground the slide 213 is withdrawn to clear the work and either of the slides 74 and 75 or the table 17 (depending on which was used for rapidly moving the work toward the grinding wheel) is unlocked and moved rapidly away from the grinding wheel to obtain clearance whereby the work may be conveniently removed and replaced in the chuck.

It is noted that in the description of the work set up reference was made only to the machine as shown in Figs. 1 through 17 wherein the table 17 forms part of the machine. Such a table is not provided in the bench type of machine of Figs. 18 through 23. This would limit or exclude some of the set-ups just described when using the bench type machine as shown with two slides under the work head. However, this is overcome by adding another slide similar to slides 74 and 75 under the work head as a substitute for the table 17 and then raising the tool head 205 a corresponding amount by the insertion of suitable fillers or separators below the tool head.

Figure 32:
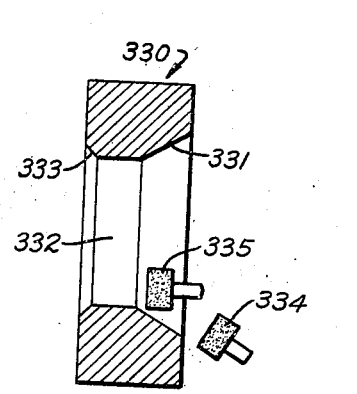
Figs. 32, 33, 34, and 35 are sectional views of dies which are ground internally with my present machine.

In Figs. 32 through 35 are shown modifications of work involving multiple annular and annular angular internal surfaces required to be ground to which my present machine is ideally suited for production grinding. Thus the die 330 of Fig. 32 is shown as having surfaces 331, 332 and 333 to be ground. For this job the tool head is set to position the grinding wheel as at 334 and the work moved as by movement of slide 74 or slide 75 whereby to grind surface 331. Then the tool head is swung back to position the axis of the grinding wheel parallel with that of the table 17 as at 335 and then on feed of the work by the table surface 332 is ground. Next one of the slides 74 and 75 having been previously set is manipulated to carry the work at an angle to the grinding wheel and the latter remaining as at 335 work surface 333 is ground. Wheel 335 may be and preferably is the same wheel as that numbered 334 but in a new position although it may be another wheel.

Figure 33:
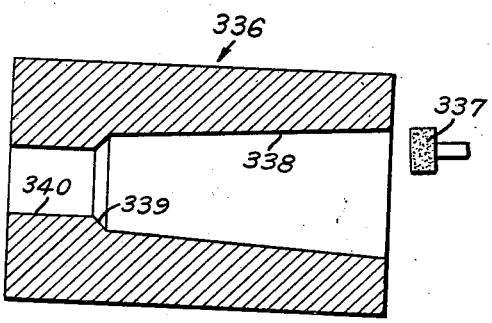
Figure 34:
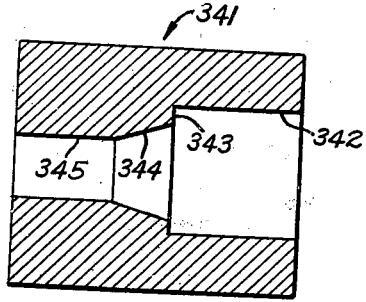

When grinding the die 336 of Fig. 33 the grinding wheel 337 may be positioned parallel to the longitudinal axis of the table 17. Slide 74 (this is by way of example as slide 75 may equally well be used) is properly set and as it is reciprocated the work is moved at an angle and the surface 338 ground. Then slide 74 is locked against casual movement and slide 75 having been previously set is reciprocated to carry the work at the angle of surface 339 and the latter is ground. Surface 340 of the work may be ground by a straight reciprocating movement of the work imparted by reciprocating the table 17.

The surfaces 342, 343, 344, and 345 of die 341 (Fig. 34) may be ground in one set up of the machine. Surfaces 342 and 345 being straight may be ground by reciprocating the work with table 17 or one of such surfaces may thus be ground and the other by reciprocating either slide 74 or slide 75. Surface 343 will be ground by a transverse feed of the grinding wheel on manipulation of the hand wheel 201 or by reciprocation of one of the slides 74 and 75 disposed transversely of the machine. Angular surface 344 is ground by reciprocating the work at such angle through manipulation of a previously set one of the slides 74 and 75.

Figure 35:
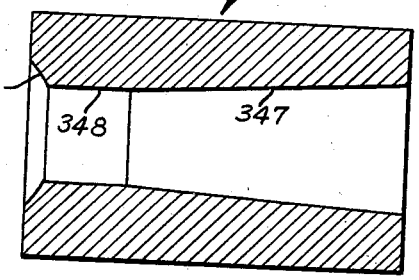

Die 346 of Fig. 35 has surfaces 347, 348 and 349 to be ground. The grinding wheel may be set parallel to the table 17 in this instance and the work is moved at the angle of surface 347 by reciprocation of a previously set one of the slides 74 and 75. Thereafter the movement required for grinding of surface 348 may be imparted by reciprocation of the table 17 the surface 348 being straight. Surface 349 is ground using the arrangement of Fig. 31 previously described.

In any of the various grinding operations to be performed where one possible feed is being used the others are all locked against casual movement. Thus when the table 17 is being reciprocated the various slides are locked and when a slide is being reciprocated the other slides and tables are locked. This is to avoid any casual movement of parts such as would result in chatter marks on the work or the grinding of the latter at incorrect angles and the like. In such connection it is noted that the machine of the invention is adapted for precision grinding. Further the position of the work head and tool heads may be reversed if that is desired since the various projections, and sockets to receive such various projections, are standard as to shape and size throughout the machine. Thus the various parts are in a large measure interchangeable. Further it is to be understood that the number of slides employed may be increased for more complicated jobs.

Having thus set forth the nature of my invention, what I claim is:

1. In a grinding machine, a base, a work head and a tool head on said base, a first reciprocable slide, swivel means mounting said slide for radial adjustment, a second reciprocable slide, swivel means mounting the second reciprocable slide on the first reciprocable slide for radial adjustment relative thereto, swivel means mounting one of said heads on the second reciprocable slide for radial adjustment relative thereto, and swivel means mounting the other of said heads for independent radial adjustment.

2. In a grinding machine, a work holder and a tool holder each including a head and a base portion, means mounting said base portions for adjustments in planes substantially at right angles to one another, a pair of reciprocable slides, swivel means mounting one of said slides on one of said base portions and the other of said slides on the slide so mounted, swivel means mounting one of said heads on said other of said slides, a carriage, means for feeding said carriage in the plane in which said other base portion is adjustable, a slide adapted for rectilinear movement, a swivel means mounting said slide on said other base portion and said carriage for radial adjustment relative thereto, means for imparting rectilinear movement to the last named slide, and swivel means mounting the other of said heads on the last named slide for radial adjustment relative thereto.

3. In a grinding machine, a bed, a table, a carriage, means mounting said table and carriage on said bed for movements thereon in directions transverse to one another, a work holder and a tool holder each including a head and a base portion, means mounting one of said base portions on said table for adjustment thereon in the direction in which the table is movable, means mounting the other of said base portions on said carriage for adjustment in a direction transverse to that in which said table is movable, a pair of reciprocable slides, swivel means mounting one of said slides on one of said base portions and the other of said slides on the slide so mounted, swivel means mounting one of said heads on said other of said slides, means for feeding said carriage on said bed, a slide adapted for rectilinear movement, a swivel means mounting said slide on said other of said base portions for radial adjustment, means for imparting rectilinear movement to the last named slide, and swivel means mounting the other of said heads on the last named slide for radial adjustment relative thereto.

4. In a grinding machine, a base having a pair of slots opening through the upper face thereof substantially at right angles to one another, a work holder and a tool holder each including a head and a base portion, means mounting said base portions on said base for relative adjustment thereon in the directions of and along the respective slots, a pair of reciprocable slides, swivel means mounting one of said slides on one of said base portions and the other of said slides on the slide so mounted, swivel means mounting one of said heads on said other of said slides, a carriage on the other of said base portions, means for feeding said carriage on said base portion in the plane in which said base portion is adjustable, a slide adapted for rectilinear movement, a swivel means mounting said slide on said carriage for radial adjustment relative thereto, means for imparting rectilinear movement to the last named slide, and swivel means mounting the other of said heads on the last mentioned slide for radial adjustment relative thereto.

5. In a grinding machine, a work holder and a tool holder each including a head and a base portion, means mounting said base portions for adjustments in planes substantially at right angles to one another, a reciprocable slide, swivel means mounting said slide on one of said base portions, swivel means mounting one of said heads on said slide, a carriage, means for feeding said carriage in the direction in which said other base portion is adjustable, a slide, a swivel means mounting said slide on said other base portion and said carriage, means for imparting sliding movement to the last mentioned slide, and swivel means mounting the other of said heads on the last mentioned slide for radial adjustment relative thereto.

6. In a grinding machine, a work holder and a tool holder each including a head and a base, means mounting said bases, a reciprocable slide, swivel means mounting said slide on one of said bases, swivel means mounting one of said heads on said slide, a carriage, means for feeding said carriage, a slide, swivel means mounting said slide on said other base and said carriage, means for imparting sliding movement to the last mentioned slide, and swivel means mounting the other of said heads on the last mentioned slide for adjustment relative thereto.

7. In a grinding machine, a work holder and a tool holder each including a head and a base, means mounting said bases, a pair of reciprocable slides, swivel means mounting one of said slides on one of said bases and the other of said slides on the slide so mounted, swivel means mounting one of said heads on said other of said slides, a carriage, means for feeding said carriage, a slide adapted for rectilinear movement, a swivel means mounting the last mentioned slide on said other base and said carriage for radial adjustment relative thereto, means for imparting rectilinear movement to the last named slide, and swivel means mounting the other of said heads on said last named slide for radial adjustment relative thereto.

8. In a grinding machine, a work holder and a tool holder each including a head and a base portion, means mounting said base portions for adjustment in planes substantially at right angles to one another, a pair of reciprocable slides, swivel means mounting one of said slides on one of said base portions and the other of said slides on the slide so mounted, swivel means mounting one of said heads on the other of said slides, a carriage, means for feeding said carriage in the plane in which the said other base portion is adjustable, and swivel means mounting the other of said heads on said other base portion and said carriage for radial adjustment relative thereto.

9. In a grinding machine, a work holder and a tool holder each including a head and a base portion, means mounting said base portions for adjustment in planes substantially at right angles to one another, a pair of reciprocable slides, swivel means mounting one of said slides on one of said base portions and the other of said slides on the slide so mounted, swivel means mounting one of said heads on said other of said slides, a carriage, means for feeding said carriage in the plane in which the said other base portion is adjustable, a slide adapted for rectilinear movement, a swivel means mounting said slide on said other base portion and said carriage for radial adjustment relative thereto, means for imparting rectilinear movement to said slide, and means mounting the other of said heads on said slide.

10. In a grinding machine, a work holder and a tool holder each including a head and a base portion, means mounting said base portions for adjustment in planes substantially at right angles to one another, a pair of reciprocable slides, swivel means mounting one of said slides on one of said base portions and the other of said slides on the slide so mounted, means mounting one of said heads on said other of said slides, a carriage, means for feeding said carriage in the plane in which the said other base portion is adjustable, a slide adapted for rectilinear movement, a swivel means mounting the last mentioned slide on said other base portion and said carriage for radial adjustment relative thereto, means for imparting rectilinear movement to the last named slide, and swivel means mounting the other of said heads on the last named slide for radial adjustment relative thereto.

11. In a grinding machine, a work holder and a tool holder each including a head and a base portion, means mounting said base portions for adjustments in planes substantially at right angles to one another, a reciprocable slide, swivel means mounting said slide on one of said base portions, means mounting one of said heads on said slide, a carriage, means for feeding said carriage in the direction in which the said other base portion is adjustable, a slide, a swivel means mounting said slide on said other base portion and said carriage, means for imparting sliding movement to said slide, and swivel means mounting the other of said heads on said slide for radial adjustment relative thereto.

12. In a grinding machine, a bed, a table, a carriage means mounting said table and carriage for movements on said bed in directions transverse to one another, a work holder and a tool holder each including a head and a base portion, means mounting one of said base portions on said table for adjustment thereon in the direction in which said table is movable on the bed, means mounting the other of said base portions on said carriage for adjustment in a direction transverse to that in which said table is movable, a pair of reciprocable slides, swivel means mounting one of said slides on one of said base portions and the other of said slides on the slide so mounted, swivel means mounting one of said heads on said other of said slides, means for feeding said carriage on said bed, and swivel means mounting the other of said heads on said carriage for radial adjustment relative thereto.

13. In a grinding machine, a bed, a table, a carriage means mounting said table and carriage for movements on said bed in directions transverse to one another, a work holder and a tool holder each including a head and a base portion, means mounting one of said base portions on said table for adjustment thereon in the direction in which the table is movable, means mounting the other of said base portions on said carriage for adjustment in a direction transverse to that in which said table is movable, a pair of reciprocable slides, swivel means mounting one of said slides on one of said base portions and the other slide on the slide so mounted, means mounting one of said heads on said other of said slides, means for feeding said carriage on said bed, a slide adapted for rectilinear movement, a swivel means mounting said slide on said carriage for radial adjustment, means for imparting rectilinear movement to the last named slide, and swivel means mounting the other of said heads on said last named slide for radial adjustment relative thereto.

14. In a grinding machine, a bed, a table, a carriage means mounting said table and carriage for movements on said bed in directions transverse to one another, a work holder and a tool holder each including a head and a base portion, means mounting one of said base portions on said table for adjustment thereon in the direction in which the table is movable, means mounting the other of said base portions on said carriage for adjustment in a direction transverse to that in which the table is movable, a pair of reciprocable slides, swivel means mounting one of said slides on one of said base portions and the other of said slides on the slide so mounted, swivel means mounting one of said heads on said other of the slides, means for feeding said carriage on said bed, a slide adapted for rectilinear movement, a swivel means mounting the last mentioned slide on said carriage for radial adjustment, means for imparting rectilinear movement to the last named slide, and means mounting the other of said heads on said last named slide.

15. In a grinding machine, a base having a pair of slots opening through the upper face thereof substantially at right angles to one another, a work holder and a tool holder each including a head and a base portion, means mounting said base portions on said base for relative adjustment thereon along the respective slots, a pair of reciprocable slides, swivel means mounting one of said slides on one of said base portions and the other of said slides on the slide so mounted, swivel means mounting one of said heads on said other slide, a carriage mounted on the other of said base portions, means for feeding said carriage on said base portion in the plane in which the latter is adjustable, and swivel means mounting the other of said heads on said carriage for radial adjustment relative thereto.

16. In a grinding machine, a base having a pair of slots opening through its upper face and arranged substantially at right angles to one another, a work holder and a tool holder each including a head and a base portion, means mounting said base portions on said base for relative adjustment thereon along the lengths of the respective slots, a pair of reciprocable slides, swivel means mounting one of said slides on one of said base portions and the other of said slides on the slide so mounted, means mounting one of said heads on said other slide, a carriage on the other of said base portions, means for feeding said carriage on said base portion in the plane in which the latter is adjustable, a slide adapted for rectilinear movement, a swivel means mounting said slide on said carriage for radial adjustment relative thereto, means for imparting rectilinear movement to the last named slide, and swivel means mounting the other of said heads on the last mentioned slide for radial adjustment relative thereto.

17. In a grinding machine, a base having a pair of slots opening through the upper face thereof substantially at right angles to one another, a work holder and a tool holder each including a head and a base portion, means mounting said base portions on said base for relative adjustment thereon in the directions of and along the respective slots, a pair of reciprocable slides, swivel means mounting one of said slides on one of said base portions and the other of said slides on the slide so mounted, swivel means mounting one of said heads on said other of said slides, a carriage on the other of said base portions, means for feeding said carriage on said base portion in the plane of adjustment of the latter, a slide adapted for rectilinear movement, a swivel means mounting said slide on said carriage for radial adjustment relative thereto, means for imparting rectilinear movement to the last named slide, and means mounting the other of said heads on the last named slide.

18. In a grinding machine, a work holder and a tool holder each including a head and a base portion, means mounting said base portions for adjustments in planes substantially at right angles to one another, a pair of reciprocable slides, swivel means mounting one of said slides on one of said base portions and the other of said slides on the slide so mounted, swivel means mounting one of said heads on the said other of said slides, a slide adapted for rectilinear movement, a swivel means mounting the last named slide on the other of said base portions for radial adjustment relative thereto, means for imparting rectilinear movement to the last named slide, and swivel means mounting the other of said heads on the last slide for radial adjustment thereon.

19. In a grinding machine, a bed, a table, means mounting said table on the bed for movement thereon, a work holder and a tool holder each including a head and a base portion, means mounting one of said base portions on said table for adjustment thereon in the direction in which the table is movable, means mounting the other of said base portions on said bed for adjustment in a direction transverse to that in which the table is movable, a pair of reciprocable slides, swivel means mounting one of said slides on one of said base portions and the other of said slides on the slide so mounted, swivel means mounting one of said heads on said other of said slides, a slide adapted for rectilinear movement, a swivel means mounting said slide on the other of said base portions for radial adjustment, means for imparting rectilinear movement to the last named slide, and swivel means mounting the other of said heads on the last named slide for radial adjustment relative thereto.

20. In a grinding machine, a base having a pair of slots opening through the upper face thereof and located substantially at right angles to one another, a work holder and a tool holder each including a head and a base portion, means mounting said base portions on said base for relative adjustment thereon in the directions of and along the respective slots, a pair of reciprocable slides, swivel means mounting one of said slides on one of said base portions and the other of said slides on the slide so mounted, swivel means mounting one of said heads on said other of said slides, a slide adapted for rectilinear movement, a swivel means mounting the last named slide on the other of said base portions for radial adjustment relative thereto, means for imparting rectilinear movement to the last named slide, and swivel means mounting the other of said heads on the last named slide for radial adjustment thereon.

21. In a grinding machine, a work holder and a tool holder each including a head and a base portion, means mounting said base portions for adjustments in planes substantially at right angles to one another, a reciprocable slide, swivel means mounting said slide on one of said base portions, swivel means mounting one of said heads on said slide, a slide adapted for rectilinear movement, a swivel means mounting the last named slide on the other of said base portions, means for imparting rectilinear movement to the last named slide, and swivel means mounting the other of said heads on the last named slide for radial adjustment thereon.

22. In a grinding machine, a bed, a table, means mounting said table on said bed for movement thereon, a work holder and a tool holder each including a head and a base portion, means mounting one of said base portions on said table for adjustment thereon in the direction in which the table is movable, means mounting the other of said base portions on said bed for adjustments in directions transverse to that in which the said table is movable, a reciprocable slide, swivel means mounting said slide on one of said base portions, swivel means mounting one of said heads on said slide, a slide adapted for rectilinear movement, swivel means mounting said slide on the other of said base portions for radial adjustment, means for imparting rectilinear movement to the last named slide, and swivel means mounting the other of said heads on the last named slide for radial adjustment relative thereto.

23. In a grinding machine, a base having a pair of slots opening through the upper face thereof substantially at right angles to one another, a work holder and a tool holder each including a head and a base portion, means mounting said base portions on said base for relative adjustment thereon in the directions of and along the respective slots, a reciprocable slide, swivel means mounting said slide on one of said base portions, swivel means mounting one of said heads on said slide, a slide adapted for rectilinear movement, a swivel means mounting said slide on the other of said base portions for radial adjustment relative thereto, means for imparting rectilinear movement to the last named slide, and swivel means mounting the other of said heads on the last named slide for radial adjustment relative thereto.

24. In a grinding machine, a bed, a table, means mounting said table on said bed for movement thereon, a work head and a tool head, a reciprocable slide, swivel means mounting said slide for radial adjustment, means mounting said swivel means on said table for adjustment thereon in the direction in which the table is movable, swivel means mounting one of said heads on said reciprocable slide, a second reciprocable slide, swivel means mounting said second slide independent of the first mentioned slide and for radial adjustment, and swivel means mounting the other of said heads on said second slide.

25. In a grinding machine, a base, a work head and a tool head, a reciprocable slide, swivel means mounting said slide for radial adjustment, means mounting said swivel means on said base for bodily adjustment thereon in a single plane, swivel means mounting one of said heads on said slide, a second slide, swivel means mounting said second slide independent of the first mentioned slide, means mounting the second mentioned swivel means on said base for bodily adjustment thereon in a direction at right angles to that in which the first swivel means is adjustable, and swivel means mounting the other of said heads on said second slide.

26. In a grinding machine, a bed, a table on said bed and movable thereon, means for moving said table on said bed, and said means including a pair of spaced sprocket shafts, a sprocket fixed to one of said shafts, a pair of sprockets turnable about said shaft as a unit, a pair of sprockets turnable about the other of said shafts as a unit, a sprocket turnable about said other shaft independent of said pair of sprockets, a chain trained over the sprocket fixed to the shaft and a sprocket of the pair turnable as a unit about the other shaft, a chain trained over the other sprocket of said pair and a sprocket of the first mentioned pair, a third chain trained over the other sprocket of the first mentioned pair and the independent sprocket on the said other of said shafts, means for manually rotating the first mentioned shaft, and means connecting the third chain with said table.

27. In combination, a slide including a stationary portion and a portion movable on said stationary portion, a swivel means mounting said stationary portion, said swivel means including a securing means whereby said slide may be secured in the desired position of radial adjustment, means including a feed screw for feeding said movable portion on said stationary portion, a bar rigid with said stationary portion, means carried by the movable portion and movable along said bar, and means for causing said means carried by the movable portion to grip said bar and thereby secure said movable portion in fixed relation to said stationary portion.

28. In combination, a slide, a head, a body at the upper side of said slide, means mounting said body on said slide for radial adjustment relative thereto, a mount on said body and supporting said head, said mount radially adjustable on the body, means individual to said slide and said mount to secure the body in fixed relation to said slide and the mount in fixed relation to said body, said slide at its upper side supporting a pair of fixed stops, said mount including a radial flange overlying said stops, and a pair of adjustable means on said mount and adapted to engage the respective stops on the slide as said mount is turned predetermined distances on said body, said adjustable means carried by said radial flange of said mount.

29. In a grinding machine, a base, a table mounted for movement on said base, a work holder and a tool holder, means mounting one of said holders on said table for movement therewith, said table mounted for movement toward and from the other of said holders, said holder on the table including a reciprocable slide disposed transversely of the plane of movement of the table, a head on said slide, a profile cam on said base, said slide including a part engaging said cam whereby as said slide and head are moved toward the other of said holders on movement of said table said slide is moved and moves said head transversely of the plane of movement of the table in accordance with the profile of said cam, said other holder including a carriage, means mounting said carriage for movement transverse to the plane of movement of said table, a compensating slide, a swivel means mounting said compensating slide on said carriage, a head, and a swivel means mounting said head on said compensating slide.

30. In a grinding machine, a base, a table mounted for movement on said base, a work holder and a tool holder, means mounting one of said holders on said table, said table mounted for movement toward and from the other of said holders, said holder on the table including a reciprocable slide disposed transverse to the plane of movement of the table, a head on said slide, a profile cam on said base, said slide including a part engaging said cam whereby as said slide and head are moved toward the other of said holders on movement of said table said slide is moved and moves said head in accordance with the profile of said cam, said other holder including a slide, swivel means mounting the last mentioned slide for radial adjustment, a head, and swivel means mounting said head on said last mentioned slide.

31. In a grinding machine, a base, a table mounted for movement on said base, a work holder and a tool holder, means mounting one of said holders on said table, said table mounted for movement toward and from the other holder, said holder on the table including a reciprocable slide disposed transverse to the plane of movement of said table, a head on said slide, a profile cam on said base, said slide including spring means normally tending the slide in one direction, means on said slide and normally maintained against said cam by said spring means whereby as the slide and head are moved in one direction with said table said slide is moved against the tendency of said spring means and moves the head in accordance with the profile of said cam, manual means for holding said slide against the tendency of said spring means whereby during return movement of the table the slide is maintained away from said cam, and adjustable means controlling movement of said slide by said manual means.

32. In a grinding machine, a base, a support mounted for movement on said base, a work holder and a tool holder, means mounting one of said holders on said support for movement therewith, said support mounted for movement toward and from the other of said holders, said holder on the support including a reciprocable slide disposed transverse to the plane of movement of the support on the base, a head on said slide, a cam mount, means securing said mount on said base for adjustment thereon in generally parallel relation to movement of said support, a profile cam secured to said mount, and said slide including a part engaging said cam whereby as said slide is moved on movement of said support said slide is also moved in accordance with the profile of said cam.

33. A slide for use in a grinding machine of the class described, said slide comprising a stationary part and a part movable on said stationary part, said parts having complementary ways, said movable part on the upper side of said stationary part, said movable part including side and end portions overlying the sides and ends of the stationary part, said stationary part including an elongated portion on which said movable part is movable, and lower cover plates on the end portions of said movable part and closing the space between such end portions and the ends of said elongated portion of the stationary part in all positions of the movable part on said stationary part.

34. In a head for use in a grinding machine, a body including a pair of spaced sleeve-like portions internally tapered and of greatest diameter toward their outer ends, an externally tapered bearing in each of said portions and extending into the space between the latter, a spindle in said bearings, a pair of nuts between said portions and each threaded to one of said bearings and abutting the adjacent end of the portion to whose bearing it is threaded, said nuts adapted to be turned to draw said bearings inwardly in their respective sleeve-like portions to tighten them and compensate for wear, and said nuts having annular interlocking portions whereby dust and the like is prevented from entering between them.

35. In a head for use in a grinding machine, a body including a pair of spaced sleeve-like portions internally tapered and of greatest diameter toward their outer ends, an externally tapered bearing in each of said portions and extending into the space between the latter, a spindle in said bearings, said spindle having a radial flange engaging the outer end of one of said bearings, means on the outer end of the engaged bearing and abutting the outer end of the sleeve-like portion of the latter and overlying said flange to exclude dust and the like from the bearing, a pair of nuts between said sleeve-like portions and each threaded to one of said bearings and abutting the adjacent end of the portion to whose bearing it is threaded, said nuts adapted to be turned to draw said bearings inwardly in their respective sleeve-like portions to tighten them and compensate for wear, and said nuts having annular interlocking portions whereby dust and the like is excluded from between them.

WALTER G. WESSMAN.